United States Patent
Tamiya et al.

(10) Patent No.: US 12,199,638 B2
(45) Date of Patent: Jan. 14, 2025

(54) INFORMATION CONCEALING APPARATUS, INFORMATION RECONFIGURING APPARATUS, INFORMATION CONCEALING SYSTEM, INFORMATION CONCEALING METHOD, INFORMATION RECONFIGURING METHOD, INFORMATION CONCEALING PROGRAM, AND INFORMATION RECONFIGURING PROGRAM

(71) Applicant: NEC Corporation, Tokyo (JP)

(72) Inventors: Hiroto Tamiya, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/034,548

(22) PCT Filed: Nov. 17, 2020

(86) PCT No.: PCT/JP2020/042860
§ 371 (c)(1),
(2) Date: Apr. 28, 2023

(87) PCT Pub. No.: WO2022/107226
PCT Pub. Date: May 27, 2022

(65) Prior Publication Data
US 2023/0396273 A1 Dec. 7, 2023

(51) Int. Cl.
*H03M 13/19* (2006.01)
*H03M 13/00* (2006.01)

(52) U.S. Cl.
CPC ......... *H03M 13/19* (2013.01); *H03M 13/611* (2013.01)

(58) Field of Classification Search
CPC ........................... H03M 13/19; H03M 13/611
See application file for complete search history.

(56) References Cited

U.S. PATENT DOCUMENTS

| 8,276,035 B1 * | 9/2012 | Savarese | H04L 1/188 |
| | | | 714/749 |
| 2010/0281336 A1 * | 11/2010 | Seurin | H04L 9/0838 |
| | | | 714/755 |

(Continued)

FOREIGN PATENT DOCUMENTS

| JP | 2014-142663 A | 8/2014 |
| JP | 2016-533694 A | 10/2016 |

OTHER PUBLICATIONS

International Search Report for PCT Application No. PCT/JP2020/042860, mailed on Feb. 16, 2021.

(Continued)

*Primary Examiner* — Samir W Rizk

(57) ABSTRACT

In order to provide an information concealing apparatus, an information reconfiguring apparatus, an information concealing system, an information concealing method, an information reconfiguring method, an information concealing program, and an information reconfiguring program to reduce information leakage risks, an information concealing system includes an information concealing apparatus, and an information reconfiguring apparatus. The information concealing apparatus generates a codeword capable of error-correcting concealment-side input information, generates noise including a predetermined error, and generates concealment information capable to reconfigure the concealment-side input information, by adding the concealment-side input information and the noise to the codeword. The information reconfiguring apparatus reconfigures the codeword from the concealment information, based on reconfiguration-side input information and the concealment information.

9 Claims, 21 Drawing Sheets

(56) References Cited

U.S. PATENT DOCUMENTS

| | | | | |
|---|---|---|---|---|
| 2012/0093221 A1* | 4/2012 | Rodriguez | ............. | H04N 19/65 |
| | | | | 375/E7.243 |
| 2014/0257800 A1* | 9/2014 | Su | ........................... | H04L 1/203 |
| | | | | 704/220 |
| 2016/0119143 A1* | 4/2016 | Fang | ....................... | G06F 18/00 |
| | | | | 713/186 |
| 2016/0142467 A1* | 5/2016 | Ban | .................... | H04L 65/1045 |
| | | | | 709/219 |
| 2016/0295486 A1* | 10/2016 | Langer | .................. | H04L 65/756 |
| 2017/0324563 A1* | 11/2017 | Isshiki | ..................... | G09C 1/00 |

OTHER PUBLICATIONS

English translation of Written opinion for PCT Application No. PCT/JP2020/042860, mailed on Feb. 16, 2021.

* cited by examiner

| | | | | | | |
|---|---|---|---|---|---|---|
| SKETCH $s$ | $c_1 + w_1$ | $c_2 + w_2$ | ... | $c_n + w_n$ | $c_{n+1} + e_1$ | ... | $c_{n'} + e_{n'-n}$ |

ERROR OF $t$ BITS OR LESS

| SKETCH $s'$ | $c'_1 + w'_1$ | $c'_2 + w'_2$ | ... | $c'_n + w'_n$ | $c'_{n+1} + e'_1$ | ... | $c'_{n'} + e'_{n'-n}$ |

ERROR OF $(t' - t)/2$ BITS

| AT TIME OF RECONFIGURATION $s \to s'$ | $c'_1 + w'_1 - w'_1$ | $c'_2 + w'_2 - w'_2$ | ... | $c'_n + w'_n - w'_n$ | $c_{n+1} + e_1 - e'_1$ | ... | $c_{n'} + e_{n'-n} - e'_{n'-n}$ |

ERROR OF $t$ BITS CAN BE CORRECTED ALTOGETHER     ERROR OF $t' - t$ BITS OR LESS

Fig. 15

INFORMATION CONCEALING APPARATUS, INFORMATION RECONFIGURING APPARATUS, INFORMATION CONCEALING SYSTEM, INFORMATION CONCEALING METHOD, INFORMATION RECONFIGURING METHOD, INFORMATION CONCEALING PROGRAM, AND INFORMATION RECONFIGURING PROGRAM

This application is a National Stage Entry of PCT/JP2020/042860 filed on Nov. 17, 2020, the contents of all of which are incorporated herein by reference, in their entirety.

TECHNICAL FIELD

The present invention relates to an information concealing apparatus, an information reconfiguring apparatus, an information concealing system, an information concealing method, an information reconfiguring method, an information concealing program, and an information reconfiguring program.

BACKGROUND ART

Electronic signature technology has hitherto been widely used with the aim of prevention of fraudulent acts such as falsification and manipulation on electronic documents, and personal authentication. In the electronic signature technology, a pair of a private key being information having high confidentiality and a public key being information that has little impact on security even if the key is disclosed, is generated and stored in advance. An electronic signature is generated for an electronic document using the private key, and whether or not the electronic document corresponding to the electronic signature has falsification, manipulation, or the like is inspected using the public key. Note that common examples of a method of storing the private key in the electronic signature technology include a method of storing the private key in an information storage medium such as an IC card. However, when the IC card is lost, stolen, or the like, security may be disadvantageously deteriorated due to leakage of the private key.

As a countermeasure to such a problem, in recent years, biometric authentication technology has been widely used, in which personal authentication is performed using biometric information, such as fingerprints, veins, and face images (for example, see PTL 1). The biometric authentication technology has advantages in fewer risks of being lost or stolen, as compared to the authentication technology using an IC card or the like. In the biometric authentication technology, features are extracted from biometric information of a user and are stored as registration information, and features of biometric information of the user input at the time of personal authentication and the registration information are compared to determine whether or not the user can be authenticated.

CITATION LIST

Patent Literature

[PTL 1] JP 2016-533694 T

SUMMARY

Technical Problem

Biometric information cannot be replaced. Thus, once biometric information of a user being registered is leaked, fraudulent acts such as spoofing as the user with the use of the leaked biometric information can occur, which may lead to violation of privacy and security of the user. On the other hand, even if a private key as replaceable information is managed with an IC card or the like, there is still a problem in that security may be deteriorated when the IC card or the like is lost, stolen, or the like. In view of this, reducing information leakage risks has been desired.

An example object of the present invention is to provide an information concealing apparatus, an information reconfiguring apparatus, an information concealing system, an information concealing method, an information reconfiguring method, an information concealing program, and an information reconfiguring program to reduce information leakage risks.

Solution to Problem

An information concealing apparatus according to the present invention includes: a codeword generating unit configured to generate a codeword capable of error-correcting concealment-side input information; a noise generating unit configured to generate noise including a predetermined error; and a concealment information generating unit configured to generate concealment information capable to reconfigure the concealment-side input information, by adding the concealment-side input information and the noise to the codeword.

An information reconfiguring apparatus according to the present invention receives concealment information, which is generated by adding concealment-side input information and noise including a predetermined weight to a codeword capable of error-correcting the concealment-side input information. The information reconfiguring apparatus includes a first reconfiguring unit configured to reconfigure the codeword from the concealment information, based on reconfiguration-side input information and the concealment information.

An information reconfiguring apparatus according to the present invention receives first concealment information, which is generated by adding first concealment-side input information and first noise including a predetermined weight to a first codeword capable of error-correcting the first concealment-side input information, and second concealment information, which is generated by adding second concealment-side input information and second noise including a predetermined weight to a second codeword capable of error-correcting the second concealment-side input information. The information reconfiguring apparatus includes a second reconfiguring unit configured to reconfigure difference information indicating a difference between the first concealment-side input information and the second concealment-side input information, based on the first concealment information and the second concealment information.

An information concealing system according to the present invention includes an information concealing apparatus; and an information reconfiguring apparatus, the information concealing apparatus including: a codeword generating unit configured to generate a codeword capable of error-correcting concealment-side input information; a noise generating unit configured to generate noise including a predetermined error; and a concealment information generating unit configured to generate concealment information capable to reconfigure the concealment-side input information, by adding the concealment-side input information and the noise to the codeword, the information reconfiguring apparatus being configured to receive the concealment information, and including a first reconfiguring unit configured to reconfigure the codeword from the concealment information, based on reconfiguration-side input information and the concealment information.

An information concealing system according to the present invention includes an information concealing apparatus; and an information reconfiguring apparatus, the information concealing apparatus including: a codeword generating unit configured to generate a codeword capable of error-correcting concealment-side input information; a noise generating unit configured to generate noise including a predetermined error; and a concealment information generating unit configured to generate concealment information capable to reconfigure the concealment-side input information, by adding the concealment-side input information and the noise to the codeword, the information reconfiguring apparatus being configured to receive first concealment information, which is generated by adding first concealment-side input information and first noise including a predetermined weight to a first codeword capable of error-correcting the first concealment-side input information, and second concealment information, which is generated by adding second concealment-side input information and second noise including a predetermined weight to a second codeword capable of error-correcting the second concealment-side input information, and including a second reconfiguring unit configured to reconfigure difference information indicating a difference between the first concealment-side input information and the second concealment-side input information, based on the first concealment information and the second concealment information.

An information concealing method according to the present invention includes: generating a codeword capable of error-correcting concealment-side input information; generating noise including a predetermined weight; and generating concealment information capable to reconfigure the concealment-side input information, by adding the concealment-side input information and the noise to the codeword.

In an information reconfiguring method according to the present invention, concealment information is generated, by an information concealing apparatus, by adding concealment-side input information input to the information concealing apparatus and noise including a predetermined weight to a codeword capable of error-correcting the concealment-side input information. The information reconfiguring method includes reconfiguring the codeword from the concealment information, based on reconfiguration-side input information and the concealment information.

In an information reconfiguring method according to the present invention, first concealment information is generated, by an information concealing apparatus, by adding first concealment-side input information input to the information concealing apparatus and first noise including a predetermined weight to a first codeword capable of error-correcting the first concealment-side input information. Second concealment information is generated, by the information concealing apparatus, by adding second concealment-side input information input to the information concealing apparatus and second noise including a predetermined weight to a second codeword capable of error-correcting the second concealment-side input information. The information reconfiguring method includes reconfiguring difference information indicating a difference between the first concealment-side input information and the second concealment-side input information, based on the first concealment information and the second concealment information.

An information concealing program according to the present invention causes a computer to execute: generating a codeword capable of error-correcting concealment-side input information; generating noise including a predetermined weight; and generating concealment information capable to reconfigure the concealment-side input information, by adding the concealment-side input information and the noise to the codeword.

In an information reconfiguring program according to the present invention, concealment information is generated, by an information concealing apparatus, by adding concealment-side input information input to the information concealing apparatus and noise including a predetermined weight to a codeword capable of error-correcting the concealment-side input information. The information reconfiguring program causes a computer to execute reconfiguring the codeword from the concealment information, based on reconfiguration-side input information and the concealment information.

In an information reconfiguring program, first concealment information is generated, by an information concealing apparatus, by adding first concealment-side input information input to the information concealing apparatus and first noise including a predetermined weight to a first codeword capable of error-correcting the first concealment-side input information. Second concealment information is generated, by the information concealing apparatus, by adding second concealment-side input information input to the information concealing apparatus and second noise including a predetermined weight to a second codeword capable of error-correcting the second concealment-side input information. The information reconfiguring program causes a computer to execute reconfiguring difference information indicating a difference between the first concealment-side input information and the second concealment-side input information, based on the first concealment information and the second concealment information.

Advantageous Effects of Invention

According to the present invention, the information concealing apparatus, the information reconfiguring apparatus, the information concealing system, the information concealing method, the information reconfiguring method, the information concealing program, and the information reconfiguring program to reduce information leakage risks can be provided. Note that, according to the present invention, instead of or together with the above effects, other effects may be exerted.

BRIEF DESCRIPTION OF THE DRAWINGS

FIG. 15 is an explanatory diagram modeling the secure sketch with noise addition according to the second example embodiment;

DESCRIPTION OF THE EXAMPLE EMBODIMENTS

Figure 1:
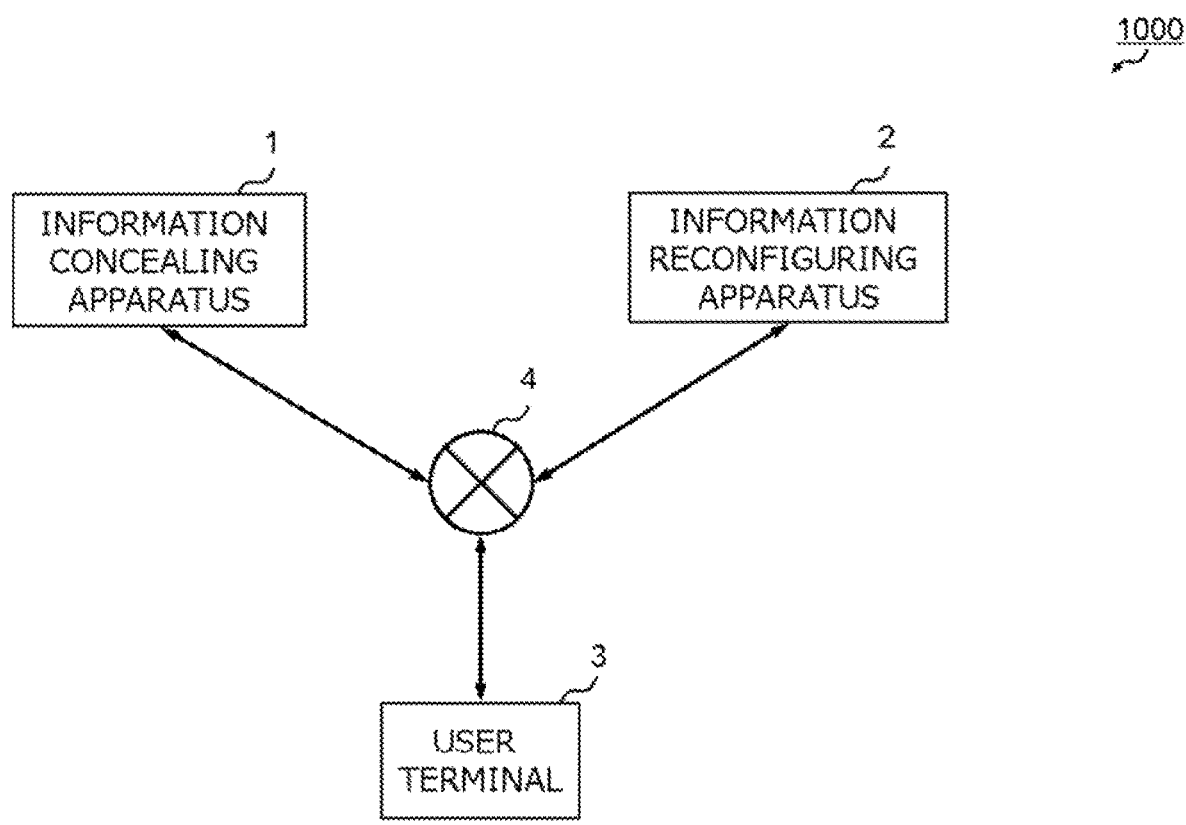
FIG. 1 is a diagram illustrating an example of an operation mode of an information concealing system according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Each example embodiment described below is merely an example of a configuration that can implement the present invention. Each example embodiment described below can be appropriately modified or changed according to a configuration of an apparatus to which the present invention is applied and various conditions. All of combinations of elements included in each example embodiment described below are not necessarily required to implement the present invention, and a part of the elements can be appropriately omitted. Hence, the scope of the present invention is not limited by the configuration described in each example embodiment described below. Configurations in which a plurality of configurations described in the example embodiments are combined can also be adopted unless the configurations are consistent with each other.

Descriptions will be given in the following order.
1. Overview of Example Embodiments of Present Invention
2. First Example Embodiment
   2.1. Overview of Operation Mode of Information Concealing System
   2.2. Hardware Configuration of Information Processing Apparatus
   2.3. Overview of Secure Sketch
   2.4. Overview of Secure Sketch Using Error Correction Code
   2.5. Problem in Secure Sketch Using Error Correction Code
   2.6. Functional Configuration of Information Concealing Apparatus
   2.7. Functional Configuration of Information Reconfiguring Apparatus
   2.8. Flow of Secure Sketch Algorithm with Noise Addition
   2.9. Flow of Reconfiguration Algorithm with Noise Addition
3. Second Example Embodiment
   3.1. Functional Configuration of Information Reconfiguring Apparatus
   3.2. Flow of Secure Sketch Algorithm with Noise Addition
   3.3. Flow of Reconfiguration Algorithm with Noise Addition
4. Third Example Embodiment
5. Other Example Embodiments 1. Overview of Example Embodiments of Present Invention First, an overview of example embodiments of the present invention will be described.

(1) Technical Issue

Electronic signature technology has hitherto been widely used with the aim of prevention of fraudulent acts such as falsification and manipulation on electronic documents, and personal authentication. In the electronic signature technology, a pair of a private key being information having high confidentiality and a public key being information that has little impact on security even if the key is disclosed, is generated and stored in advance. An electronic signature is generated for an electronic document using the private key, and whether or not the electronic document corresponding to the electronic signature has falsification, manipulation, or the like is inspected using the public key. Note that common examples of a method of storing the private key in the electronic signature technology include a method of storing the private key in an information storage medium such as an IC card. However, when the IC card is lost, stolen, or the like, security may be deteriorated due to leakage of the private key, which poses a problem.

As a countermeasure to such a problem, in recent years, biometric authentication technology has been widely used, in which personal authentication is performed using biometric information, such as fingerprints, veins, and face images. The biometric authentication technology has advantages in fewer risks of being lost or stolen, as compared to the authentication technology using an IC card or the like. In the biometric authentication technology, features are extracted from biometric information of a user and are stored as registration information, and features of biometric information of the user input at the time of personal authentication and the registration information are compared to determine whether authentication is possible or not.

Biometric information cannot be replaced. Thus, once biometric information of a user being registered is leaked, fraudulent acts such as spoofing as the user with the use of the leaked biometric information can occur, which may lead to violation of privacy and security of the user. On the other hand, even if a private key as replaceable information is managed with an IC card or the like, there is still a problem in that security may be deteriorated when the IC card or the like is lost, stolen, or the like. In view of this, reducing information leakage risks has been desired.

In view of the circumstances described above, the present example embodiment has an example object to provide an information concealing apparatus, an information reconfiguring apparatus, an information concealing system, an information concealing method, an information reconfiguring method, an information concealing program, and an information reconfiguring program to reduce information leakage risks.

(2) Technical Features

The example embodiments of the present invention include: a codeword generating unit configured to generate a codeword capable of error-correcting concealment-side input information; a noise generating unit configured to generate noise including a predetermined error; and a concealment information generating unit configured to generate concealment information capable to reconfigure the concealment-side input information, by adding the concealment-side input information and the noise to the codeword.

With this configuration, the information concealing apparatus, the information reconfiguring apparatus, the information concealing system, the information concealing method, the information reconfiguring method, the information concealing program, and the information reconfiguring program to reduce information leakage risks can be provided. Note that the technical features described above are merely a specific example of the example embodiments of the present invention, and as a matter of course, the example embodiments of the present invention are not limited to the technical features described above.

2. First Example Embodiment

With reference to FIG. 1 to FIG. 11, a first example embodiment of the present invention will be described below. The present example embodiment will describe an information concealing system that conceals biometric information of a user, such as fingerprints, veins, and face images. In the present example embodiments below, for description of a letter provided with a tilde, "(tilde)" is added following the letter.

<<2.1. Overview of Operation Mode of Information Concealing System>>

FIG. 1 is a diagram illustrating an example of an operation mode of an information concealing system 1000 according to the first example embodiment of the present invention. As illustrated in FIG. 1, in the information concealing system 1000, an information concealing apparatus 1, an information reconfiguring apparatus 2, and a user terminal 3 are connected via a network 4.

The information concealing apparatus 1 is an information processing apparatus, such as a server, which is installed with a program that performs a secure sketch based on biometric information of a user to thereby generate concealment information in which the biometric information of the user is concealed. An overview of the secure sketch in the information concealing apparatus 1 will be described below.

The information reconfiguring apparatus 2 is an information processing apparatus, such as a server, which is installed with a program that reconfigures the biometric information of the user concealed in the concealment information. An overview of the reconfiguration of the concealment information in the information reconfiguring apparatus 2 will be described below.

The user terminal 3 is an information processing apparatus operated by the user to perform reading of fingerprints and veins, capturing of face images, and the like, and is implemented with a portable information processing terminal such as a smartphone, a personal computer (PC), an automatic teller machine (ATM), and the like. The user terminal 3 includes, as an input unit 17 (see FIG. 2), a sensor for acquiring the biometric information of the user, such as fingerprints, veins, and face images.

Note that although FIG. 1 illustrates an example in which the user terminal 3 is connected to the information concealing apparatus 1 and the information reconfiguring apparatus 2 via the network 4, the user terminal 3 need not necessarily be connected to the network 4. For example, the user terminal 3 may be connected to the information concealing apparatus 1 and the information reconfiguring apparatus 2 via a Universal Serial Bus (USB) or the like. The user terminal 3 may be connected to the information concealing apparatus 1 and the information reconfiguring apparatus 2 when the user terminal 3 transmits the biometric information of the user to the information concealing apparatus 1 and when the user terminal 3 transmits the biometric information of the user to the information reconfiguring apparatus 2, respectively.

<<2.2. Hardware Configuration of Information Processing Apparatus>>

Figure 2:
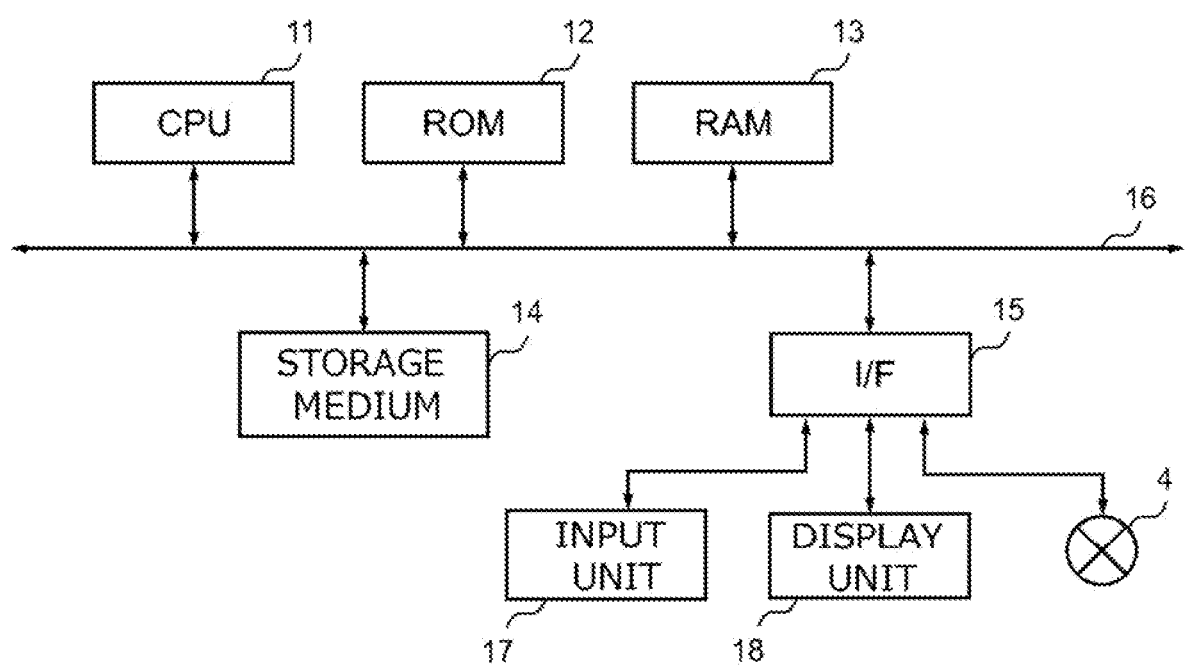
FIG. 2 is a block diagram illustrating a hardware configuration of an information processing apparatus according to the first example embodiment.

Next, with reference to FIG. 2, a hardware configuration of an information processing apparatus according to the present example embodiment, such as the information concealing apparatus 1, the information reconfiguring apparatus 2, or the user terminal 3, will be described. FIG. 2 is a block diagram illustrating a hardware configuration of the information processing apparatus.

In the information processing apparatus, a central processing unit (CPU) 11, a read only memory (ROM) 12, a random access memory (RAM) 13, a storage medium 14, and an interface (I/F) 15 are connected to each other via a bus 16. An input unit 17, a display unit 18, and the network 4 are connected to the I/F 15.

The CPU 11 is a computation means, and controls overall operations of the information processing apparatus. The RAM 13 is a volatile storage medium capable of rapid reading and writing of information, and is used as a working area when the CPU 11 processes information. The ROM 12 is a read-only non-volatile storage medium, and stores programs such as firmware. The storage medium 14 is a non-volatile storage medium, such as a hard disk drive (HDD), capable of reading and writing of information, and stores an operating system (OS), various control programs, application programs, and the like.

The I/F 15 connects the bus 16 and various pieces of hardware, the network, and the like, and performs control. The input unit 17 is an input apparatus, such as a keyboard and a mouse, for the user to input information to the information processing apparatus. The display unit 18 is a display apparatus, such as a liquid crystal display (LCD), for the user to check a state of the information processing apparatus. Note that the input unit 17 and the display unit 18 may be omitted in the information concealing apparatus 1 and the information reconfiguring apparatus 2.

As described above, the user terminal 3 includes, as the input unit 17 (see FIG. 2), a sensor for acquiring the biometric information of the user, such as fingerprints, veins, and face images.

In such a hardware configuration as described above, with the CPU 11 performing computation in accordance with the program stored in the ROM 12 and the program loaded from the storage medium 14 into the RAM 13, a software control unit of the information processing apparatus is configured. A combination of the software control unit configured as described above and the hardware configures a functional block for implementing the functions of a controller 100 (FIG. 7) of the information concealing apparatus 1, a controller 200 (FIG. 8) of the information reconfiguring apparatus 2, and the user terminal 3 according to the present example embodiment.

<<2.3. Overview of Secure Sketch>>

Figure 3:
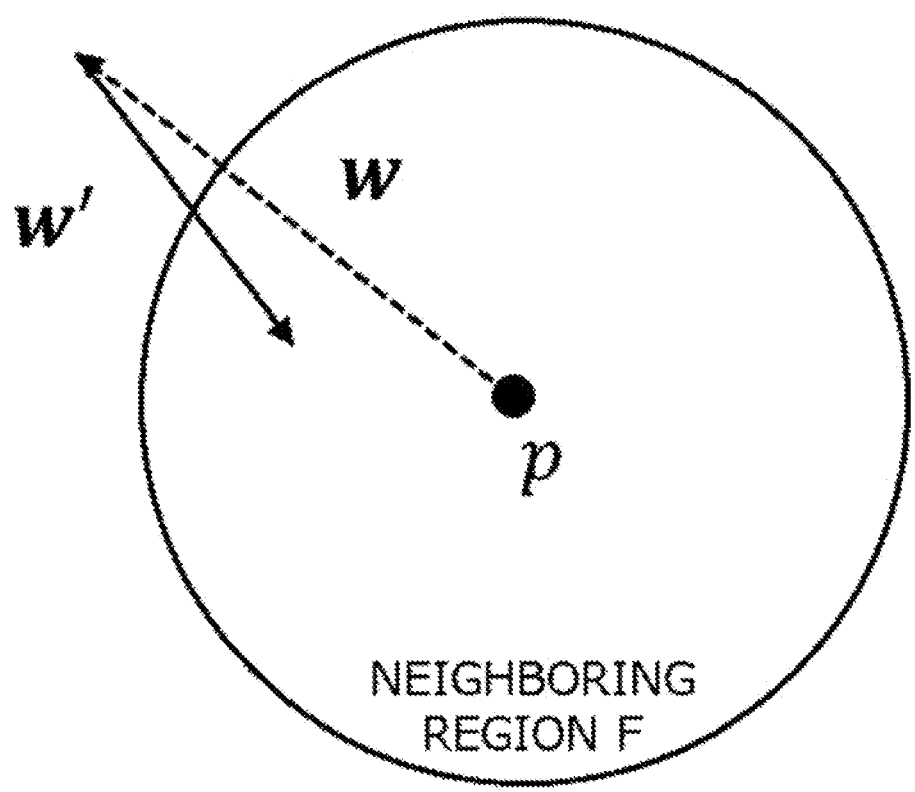
FIG. 3 is a model diagram for illustrating a secure sketch according to the first example embodiment.
Figure 4A:
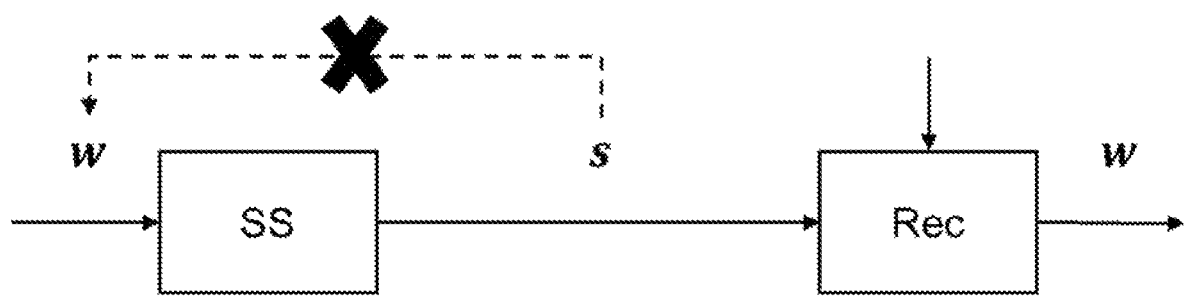
FIG. 4A is an explanatory diagram of a secure sketch algorithm and a reconfiguration algorithm according to the first example embodiment.
Figure 4B:
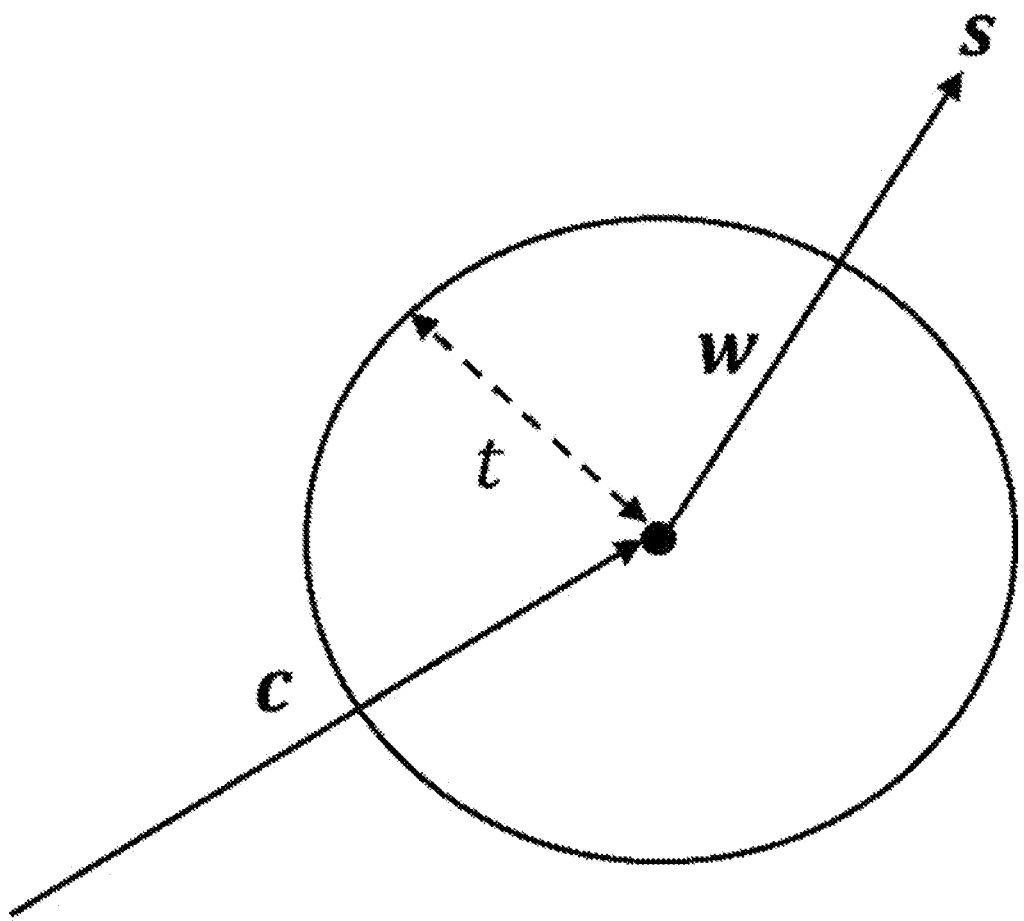
FIG. 4B is a model diagram of the secure sketch algorithm according to the first example embodiment.
Figure 4C:
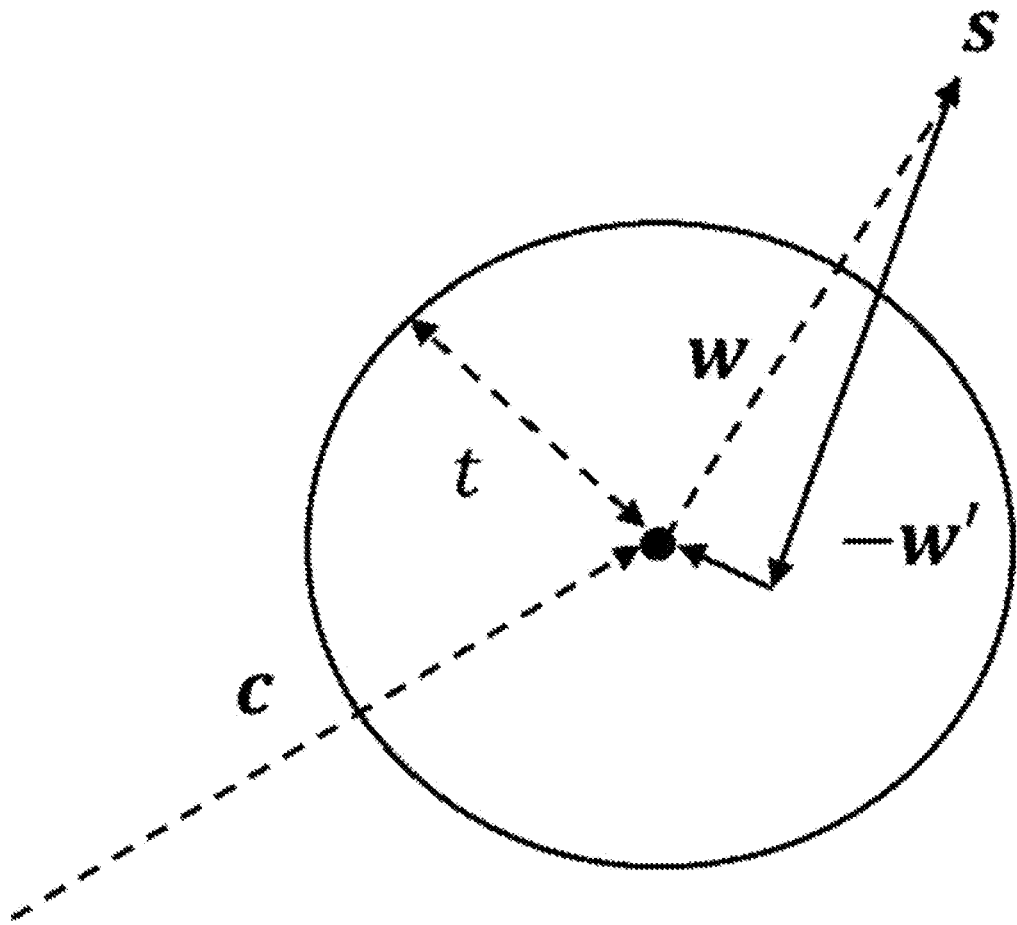
FIG. 4C is a model diagram of the reconfiguration algorithm according to the first example embodiment.

Next, with reference to FIG. 3, FIG. 4A, FIG. 4B, and FIG. 4C, a secure sketch being a method of concealing information having high confidentiality and the like will be described. FIG. 3 is a model diagram for illustrating a secure sketch. FIG. 4A is an explanatory diagram of a secure sketch algorithm (SS) and a reconfiguration algorithm (Rec). FIG. 4B is a model diagram of the secure sketch algorithm (SS). FIG. 4C is a model diagram of the reconfiguration algorithm (Rec).

In the biometric authentication technology, the biometric information of the user, such as fingerprints, veins, and face images, is registered in advance, and whether or not the user can be authenticated is determined based on results of comparison with the biometric information of the user input at the time of personal authentication. However, once the biometric information of the user being registered is leaked, fraudulent acts such as spoofing as the user with the use of the leaked biometric information can occur, which may lead to violation of privacy and security of the user.

As a countermeasure to such a problem, a method referred to as "secure sketch" is used, in which a private key is generated from information having high confidentiality. In the secure sketch, as illustrated in FIG. 3, for example, it is assumed that data "close" to registered data $$w \quad \text{[Math. 1]}$$

is input as an example of data being a vector, the input data being expressed as follows.

$$w' \quad \text{[Math. 2]}$$

The data w being a vector may be hereinafter simply referred to as "data w", and the data w' being a vector may be hereinafter simply referred to as "data w'". The secure sketch is a method in which a difference between the data w and the data w' is regarded as a noise in such a case, and the data w is output. FIG. 3 illustrates modeled input and output of the data w and the data w' in the secure sketch on an assumption that the data w and the data w' are each a vector.

In FIG. 3, the data w' "close" to the data w is defined as such data that the difference w−w' between the data w and the data w' is within a predetermined region (neighboring region F) around a point p. In the illustration of FIG. 3, the neighboring region F is a circle, but the neighboring region F is not limited to a circle.

As illustrated in FIG. 4A, the secure sketch is a method consisting of two algorithms, i.e., the secure sketch algorithm (SS) for outputting a sketch s and the reconfiguration algorithm (Rec) for outputting the data w based on the sketch s and the data w'. First, a procedure in which the data w is input and the sketch s is output in the secure sketch algorithm (SS) will be described. In the secure sketch algorithm (SS), first, a random number $$r \quad \text{[Math. 3]}$$

is generated, the generated random number r is coded using a coding function Enc to generate a codeword $$c \quad \text{[Math. 4]}$$

(Expression 1-1). The random number r being a vector may be hereinafter simply referred to as a "random number r", and the codeword c being a vector may be hereinafter simply referred to as a "codeword c". The coding function Enc is a function for converting input data (here, the random number r) into the codeword c.

[Math. 5]

$$c := Enc(r) \quad \text{(Expression 1-1)}$$

In (Expression 1-1), the random number r is generated such that the codeword c can error-correct the data w. Specifically, the random number r is generated such that t-bit error correction can be successfully performed with the codeword c. Next, in the secure sketch algorithm (SS), a value obtained by reversibly computing the codeword c and the data w is output as the sketch s (Expression 1-2). As indicated by the broken line in FIG. 4A, from the point of view of security, it is required that, regarding the sketch s, the data w cannot be inferred from the sketch s.

[Math. 6]

$$s := c + w \quad \text{(Expression 1-2)}$$

FIG. 4B illustrates the sketch s output after the data w is added to the codeword c. The sketch s being a vector may be hereinafter simply referred to as a "sketch s". As illustrated in FIG. 4B, the sketch s is out of the range in which error correction can be successfully performed with the codeword c, and thus even if error correction is performed on the sketch s, concealed data w cannot be inferred.

Next, a procedure in which the data w is output based on the sketch s and the data w' in the reconfiguration algorithm (Rec) will be described. Here, for the sake of description, it is assumed that such data w' that the difference w−w' between the data w and the data w' is within the neighboring region F is input to the reconfiguration algorithm (Rec). Here, being "within the neighboring region F" corresponds to being within the range of t bits in which error correction can be successfully performed with the codeword c.

In the reconfiguration algorithm (Rec), the sketch s is decoded using a decoding function Dec based on the data w', and a codeword c (tilde) is output (Expression 1-3). The decoding function Dec is a function for outputting the codeword c (tilde) closest to input data (here, the data w').

[Math. 7]

$$\tilde{c} := Dec(s-w') \quad \text{(Expression 1-3)}$$

Data w (tilde) output from the reconfiguration algorithm (Rec) is defined by the sketch s and the codeword c (tilde) closest to the input data w', as in (Expression 1-4).

[Math. 8]

$$\tilde{w} := s - \tilde{c} \quad \text{(Expression 1-4)}$$

Here, from (Expression 1-2), (Expression 1-3) is expressed as follows.

[Math. 9]

$$Dec(s-w') = Dec(c+w-w') \quad \text{(Expression 1-5)}$$

The data w' is within the neighboring region F with respect to the data w, and thus the difference w−w' can be error-corrected with the codeword c. In this case, it can be derived that error correction is performed on (Expression 1-5) regarding the difference w−w', and the codeword c (tilde) closest to the input data w' is the codeword c (Expression 1-6).

[Math. 10]

$$\tilde{c} = c \quad \text{(Expression 1-6)}$$

Then, from (Expression 1-6) and (Expression 1-4), the data w is reconfigured (Expression 1-7).

[Math. 11]

$$\tilde{w} = s - c = w \quad \text{(Expression 1-7)}$$

FIG. 4C illustrates the sketch s when the difference w−w' between the data w and the data w' is within the neighboring region F. As illustrated in FIG. 4B, the sketch s is out of the range in which error correction can be successfully performed with the codeword c, and thus even if error correction is performed on the sketch s, concealed data w cannot be obtained. However, by decoding the codeword c (tilde) closest to the input data w', the data w can be inferred using the reconfiguration algorithm (Rec), on the condition that the difference w−w' between the data w and the data w' is within the neighboring region F.

In this manner, in the secure sketch, by reversibly computing the codeword c for the data w to be concealed, the sketch s in the range in which error correction cannot be successfully performed with the codeword c is generated.

<<2.4. Overview of Secure Sketch Using Error Correction Code>>

Figure 5:
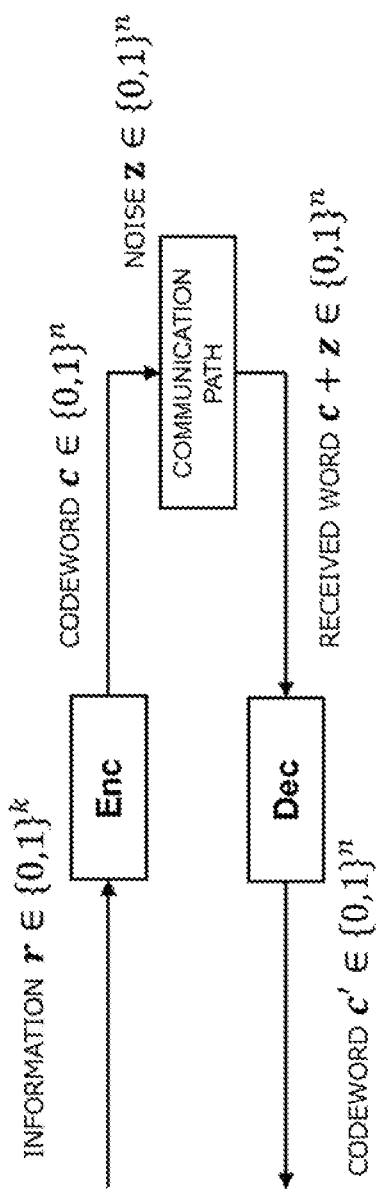
FIG. 5 is an explanatory diagram for illustrating a procedure in which an error occurring in a communication path is corrected using an error correction code according to the first example embodiment.

Next, an overview of the secure sketch using an error correction code will be described. First, with reference to FIG. 5, error correction technology will be described by taking an example of an (n, k, t)-binary linear code, which represents the number n of codeword bits, the number k of information bits, and error correction capability t (correction is possible for an error of t bits or less, in other words, the Hamming weight HW (e)≤t). FIG. 5 is an explanatory diagram illustrating a procedure in which an error occurring in a communication path is corrected using an error correction code. Note that, with an example of a BCH code, FIG. 5 illustrates an error correction procedure when information having a length of k bits with each bit being a value of 0 or 1

$$r \in \{0,1\}^k \quad \text{[Math. 12]}$$

is transmitted via a binary communication path. In FIG. 5, a flow of data is indicated by the arrow in the solid line.

The information r having a length of k bits with each bit being a value of 0 or 1 is coded by a coder into a codeword $$c \in \{0,1\}^n \quad \text{[Math. 13]}$$

having a length of n bits with each bit being a value of 0 or 1. In the codeword c having a length of n bits with each bit being a value of 0 or 1, a noise $$z \in \{0,1\}^n \quad \text{[Math. 14]}$$

having a length of n bits with each bit being a value of 0 or 1 occurs in a process of being transmitted in the communication path. As a result, a decoder receives a received word $$c+z \in \{0,1\}^n \quad \text{[Math. 15]}$$

having a length of n bits with each bit being a value of 0 or 1. Then, the received word c+z having a length of n bits with each bit being a value of 0 or 1 is error-corrected by the decoder, to be a codeword c' having a length of n bits with each bit being a value of 0 or 1.

Next, an overview of the secure sketch using the error correction code is considered. Here, it is assumed that the data $$w \in \{0,1\}^n \quad \text{[Math. 16]}$$

is distributed on a length of n bits with each bit being a value of 0 or 1, and the data w' close to the data w satisfies HW (w−w')≤t. Here, the secure sketch using the error correction code will be described by taking an example of an (n', k', t') binary linear code (for example, a BCH code), which represents the number n' of codeword bits, the number k' of information bits, and error correction capability t' (correction is possible for an error of t' bits or less, in other words, the Hamming weight HW (e)≤t'). Here, it is assumed that n'=n and t'=t.

First, a procedure in which the sketch s is output with an input being the data w distributed on a length of n bits consisting of {0, 1} in a secure sketch algorithm ($SS_{ecc}$) using the error correction code will be described. It is assumed that the data w distributed on a length of n bits with each bit being a value of 0 or 1 is input to the secure sketch algorithm ($SS_{ecc}$) using the error correction code. First, the random number r having a length of k bits with each bit being a value of 0 or 1 is generated, and the generated random number r is coded by the coding function Enc into the codeword c having a length of n bits with each bit being a value of 0 or 1 (Expression 2-1).

[Math. 17]

$$c := Enc(r) \quad \text{(Expression 2-1)}$$

In (Expression 2-1), the random number r having a length of k bits with each bit being a value of 0 or 1 is generated such that the codeword c having a length of n bits with each bit being a value of 0 or 1 can error-correct the data w having a length of n bits with each bit being a value of 0 or 1. Specifically, the random number r is generated such that t'-bit error correction can be successfully performed with the codeword c with each bit being a value of 0 or 1. Next, in the secure sketch algorithm ($SS_{ecc}$) using the error correction code, a value obtained by reversibly computing the codeword c with each bit being a value of 0 or 1 and the data w with each bit being a value of 0 or 1 is output as the sketch s (Expression 2-2).

[Math. 18]

$$s := c + w \in \{0,1\}^n \quad \text{(Expression 2-2)}$$

Next, a procedure in which the data w is output based on the sketch s having a length of n bits with each bit being a value of 0 or 1 and the data w' having a length of n bits with each bit being a value of 0 or 1 in a reconfiguration algorithm ($Rec_{ecc}$) using the error correction code will be described.

Here, it is assumed that the data w' being HW (w−w')≤t is input to the reconfiguration algorithm (Rec$_{ecc}$) using the error correction code. In the reconfiguration algorithm (Rec$_{ecc}$) using the error correction code, the sketch s having a length of n bits with each bit being a value of 0 or 1 is decoded by the decoding function Dec, based on the data w' having a length of n bits with each bit being a value of 0 or 1, and the codeword c (tilde) closest to the input data w' is output (Expression 2-3).

[Math. 19]

$$\tilde{c} := Dec(s - w') \quad \text{(Expression 2-3)}$$

The data w (tilde) output from the reconfiguration algorithm (Rec$_{ecc}$) using the error correction code is defined by the sketch s and the codeword c (tilde) closest to the input data w', as in (Expression 2-4).

[Math. 20]

$$\tilde{w} := s - \tilde{c} \in \{0,1\}^n \quad \text{(Expression 24)}$$

Here, from (Expression 2-2), (Expression 2-3) is expressed as follows.

[Math. 21]

$$Dec(s-w') = Dec(c+w-w') \in \{0,1\}^n \quad \text{(Expression 2-5)}$$

HW (w−w')≤t, and thus the difference w−w' can be error-corrected owing to the properties of the (n, k, t)-binary linear code described with reference to FIG. 5. In this case, it can be derived that, by performing error correction on the difference w−w' of (Expression 2-5), the codeword c (tilde) closest to the input data w' having a length of n bits with each bit being a value of 0 or 1 is equal to the codeword c having a length of n bits with each bit being a value of 0 or 1 (Expression 2-6).

[Math. 22]

$$\tilde{c} = c \in \{0,1\}^n \quad \text{(Expression 2-6)}$$

Then, from (Expression 2-6) and (Expression 2-4), the data w having a length of n bits with each bit being a value of 0 or 1 is reconfigured, and is output as w (tilde) (Expression 2-7).

[Math. 23]

$$\tilde{w} = s - \tilde{c} \in \{0,1\}^n = w \in \{0,1\}^n \quad \text{(Expression 2-7)}$$

<<2.5. Problem in Secure Sketch Using Error Correction Code>>

Figure 6:
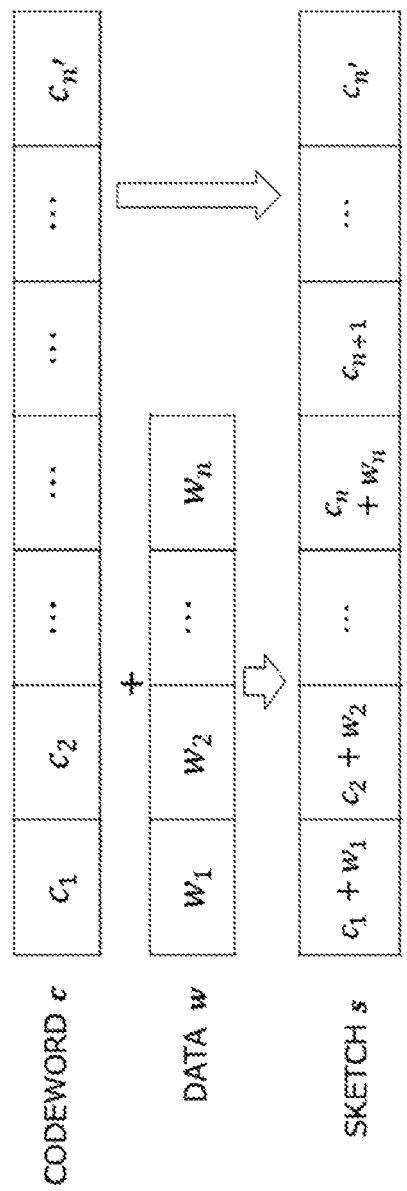
FIG. 6 is a diagram modeling a code length of a codeword larger than a length of data according to the first example embodiment.

Incidentally, when the correction capability t' of the error correction code is set based on a threshold t of a distance related to closeness of data determined from characteristics of the data w, a code length n' of the codeword c may be larger than a length n of the data w. For example, when the error of the data w is 10 bits, the data can be sufficiently error-corrected, on the condition that the codeword c is 100 bits. This, however, corresponds to a case in which the error of the data w cannot be corrected unless the codeword c is made to be 200 bits when the error of the data w is 20 bits. FIG. 6 illustrates a diagram modeling the code length n' of the codeword c larger than the length n of the data w.

When the code length n' of the codeword c is larger than the length n of the data w, all of the bits of the codeword c cannot be masked with the data w. Consequently, as illustrated in FIG. 6, the sketch s has a part ($c_1+w_1$, $c_2+w_2$, ..., $c_n+w_n$) in which the codeword c is masked with the data w and a part ($c_{n+1}$, ..., $c_{n'}$) in which the codeword c is not masked with the data w. The part ($c_{n+1}$, ..., $c_{n'}$) in which the codeword c is not masked with the data w corresponds to a part in which the random number r is coded. Thus, by decoding the part ($c_{n+1}$, ..., $c_{n'}$) in which the codeword c is not masked with the data w, information related to the random number r and the data w may be leaked.

As a countermeasure to such a problem, in the present example embodiment, by adding noise e different from the data w to the codeword c and then performing the secure sketch, risks of information leakage from the part ($c_{n+1}$, ..., $c_{n'}$) in which the codeword c is not masked with the data w are reduced.

<<2.6. Functional Configuration of Information Concealing Apparatus>>

Figure 7:
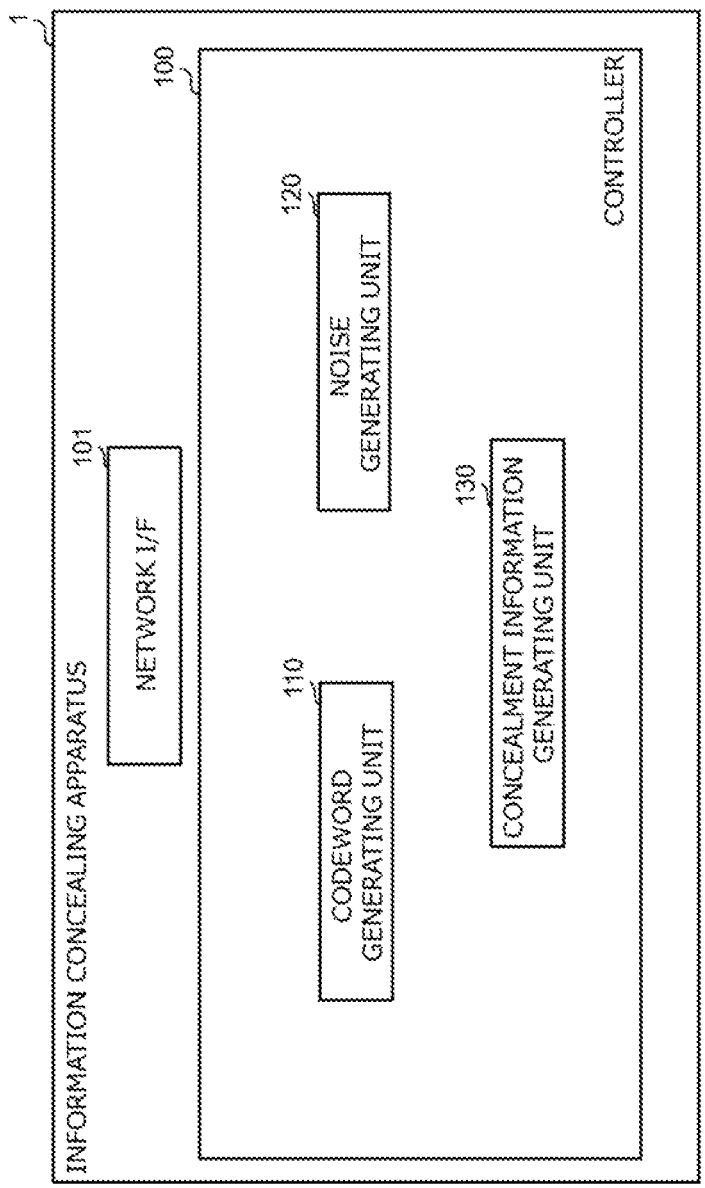
FIG. 7 is a functional block diagram illustrating a functional configuration of an information concealing apparatus according to the first example embodiment.

Next, with reference to FIG. 7, a functional configuration of the information concealing apparatus 1 will be described. FIG. 7 is a functional block diagram illustrating a functional configuration of the information concealing apparatus 1. As illustrated in FIG. 7, the information concealing apparatus 1 includes a controller 100 and a network I/F 101.

The controller 100 performs the secure sketch on the biometric information of the user from the user terminal 3 or acquired biometric information of the user and the like via the network I/F 101. The controller 100 is configured, with dedicated software or programs being installed in an information processing apparatus such as the information concealing apparatus 1. The controller 100 includes a codeword generating unit 110, a noise generating unit 120, and a concealment information generating unit 130.

The codeword generating unit 110 generates the codeword c with which error-correcting the data w is possible, with the data w being the acquired biometric information of the user. The data w corresponds to concealment-side input information of the present example. Specifically, the codeword generating unit 110 first generates the random number r, codes the random number r, and thereby generates the codeword c. In this case, the codeword generating unit 110 generates the random number r such that the data w can be error-corrected with the codeword c. Note that the codeword generating unit 110 may generate the codeword c by coding the private key, instead of the random number r.

The noise generating unit 120 generates the noise e including a predetermined error. The noise generating unit 120 determines the error of the noise e, such that data (w, e) having a length obtained by adding the generated noise e and the data w can be error-corrected with the codeword c. In other words, the predetermined error is determined such that the sum of the Hamming weights of generated noise e is equal to or less than a difference between the error correction capability with the codeword c and the error of the data w. The noise generating unit 120 may generate random noise as the noise e.

The concealment information generating unit 130 generates the sketch s as the concealment information in which the data w is concealed by adding the data w and the noise e to the codeword c. Note that it is preferable that the concealment information generating unit 130 serially concatenate the data w and the noise e, add the resultant to the codeword c, and then output the sketch s.

According to the configuration described above, the information concealing apparatus 1 generates the concealment information (sketch s) in which the biometric information (data w) of the user and the noise e are concealed with the codeword c. The sketch s generated by the information concealing apparatus 1 is transmitted to the information reconfiguring apparatus 2 via the network 4.

<<2.7. Functional Configuration of Information Reconfiguring Apparatus>>

Figure 8:
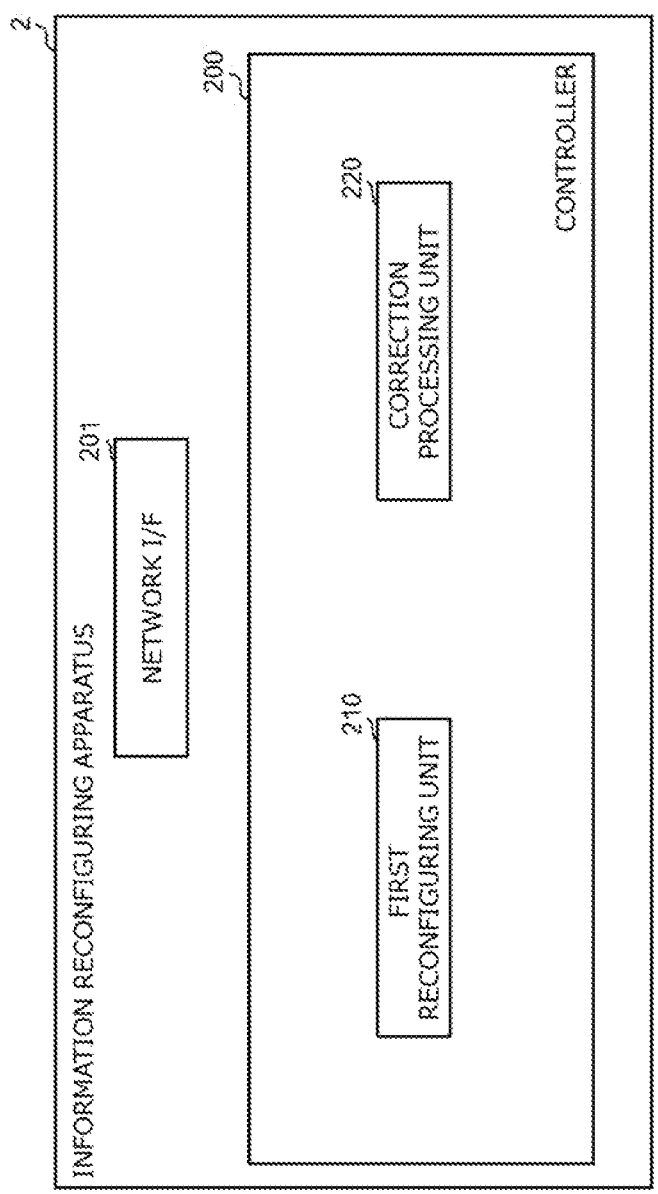
FIG. 8 is a functional block diagram illustrating a functional configuration of an information reconfiguring apparatus according to the first example embodiment.

Next, with reference to FIG. 8, a functional configuration of the information reconfiguring apparatus 2 will be described. FIG. 8 is a functional block diagram illustrating a functional configuration of the information reconfiguring apparatus 2. As illustrated in FIG. 8, the information reconfiguring apparatus 2 includes a controller 200 and a network OF 201.

The controller 200 performs acquisition of the sketch s generated by the information concealing apparatus 1 and the biometric information (data w') of the user from the user terminal 3, reconfiguration of the data w concealed in the sketch s, and the like via the network OF 201. The controller 200 includes a first reconfiguring unit 210 and a correction processing unit 220.

The first reconfiguring unit 210 reconfigures the codeword c concealed in the sketch s, based on the sketch s generated by the information concealing apparatus 1 and the biometric information (data w') of the user acquired from the user terminal 3.

The correction processing unit 220 error-corrects the data w' with the codeword c reconfigured from the sketch s. As described above, in the sketch s, the biometric information (data w) of the user is concealed. Thus, when the biometric information (data w') of the user acquired from the user terminal 3 is data close to the biometric information (data w) of the user concealed in the sketch s, the data w can be inferred by error-correcting the data w' with the codeword c reconfigured from the sketch s.

According to the configuration described above, the information reconfiguring apparatus 2 reconfigures the codeword c from the concealment information (sketch s). Then, the biometric information (data w') of the user input to the information reconfiguring apparatus 2 is error-corrected with the reconfigured codeword c, and the biometric information (data w) of the user input to the information concealing apparatus 1 is acquired.

<<2.8. Flow of Secure Sketch Algorithm with Noise Addition>>

Figure 9:
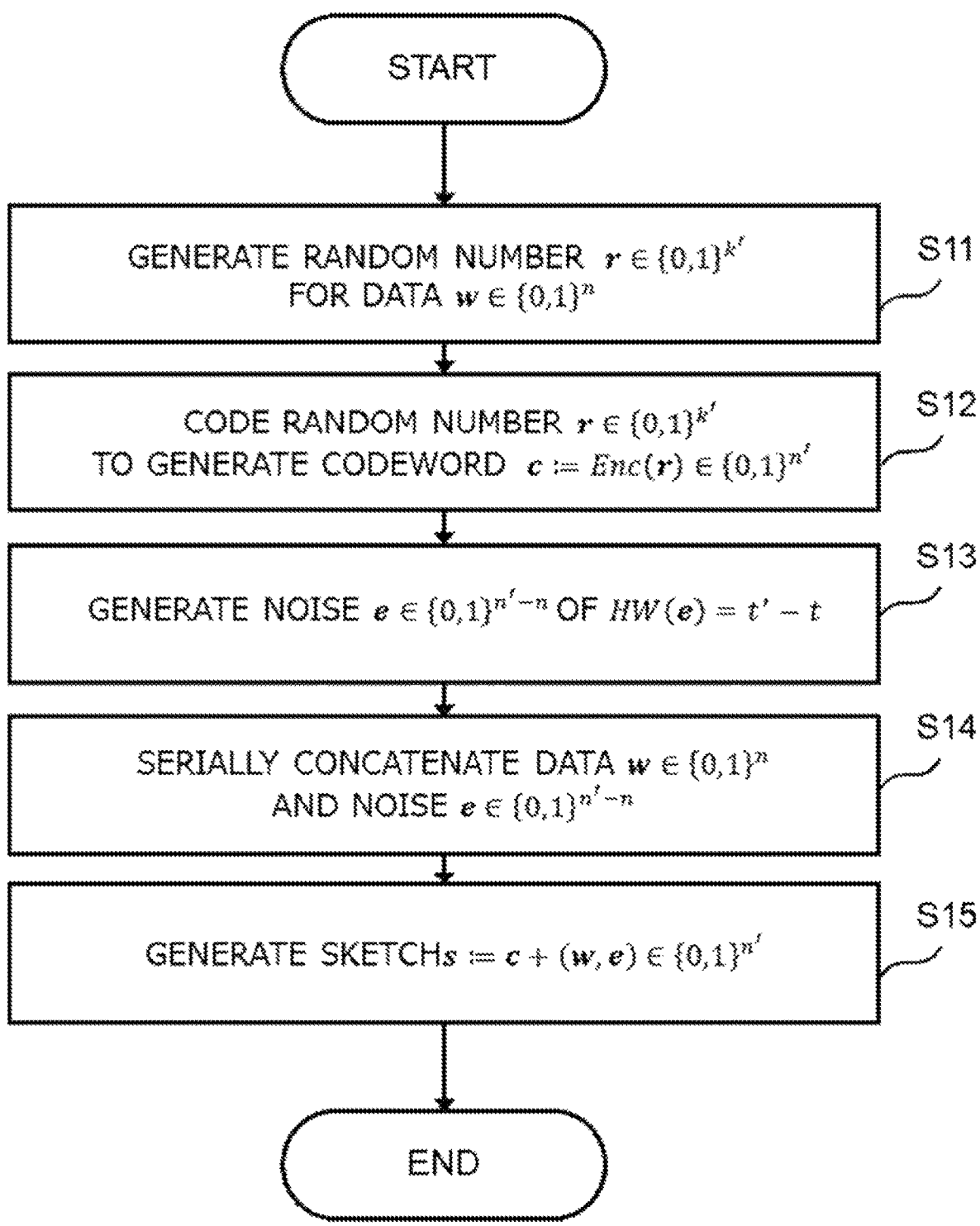
FIG. 9 is a flowchart illustrating a secure sketch algorithm with noise addition using the error correction code according to the first example embodiment.
Figure 10:
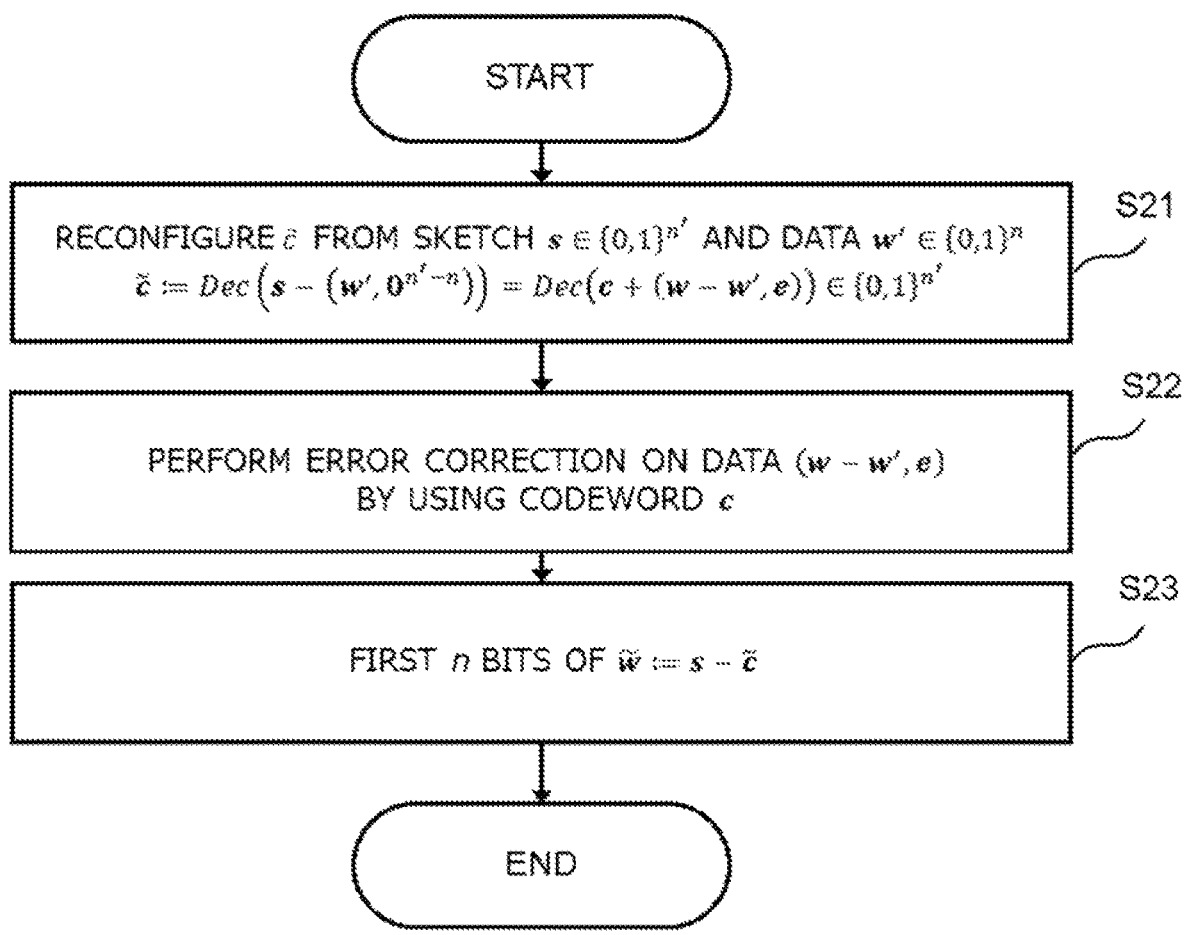
FIG. 10 is a flowchart illustrating a reconfiguration algorithm with noise addition using the error correction code according to the first example embodiment.
Figure 11:
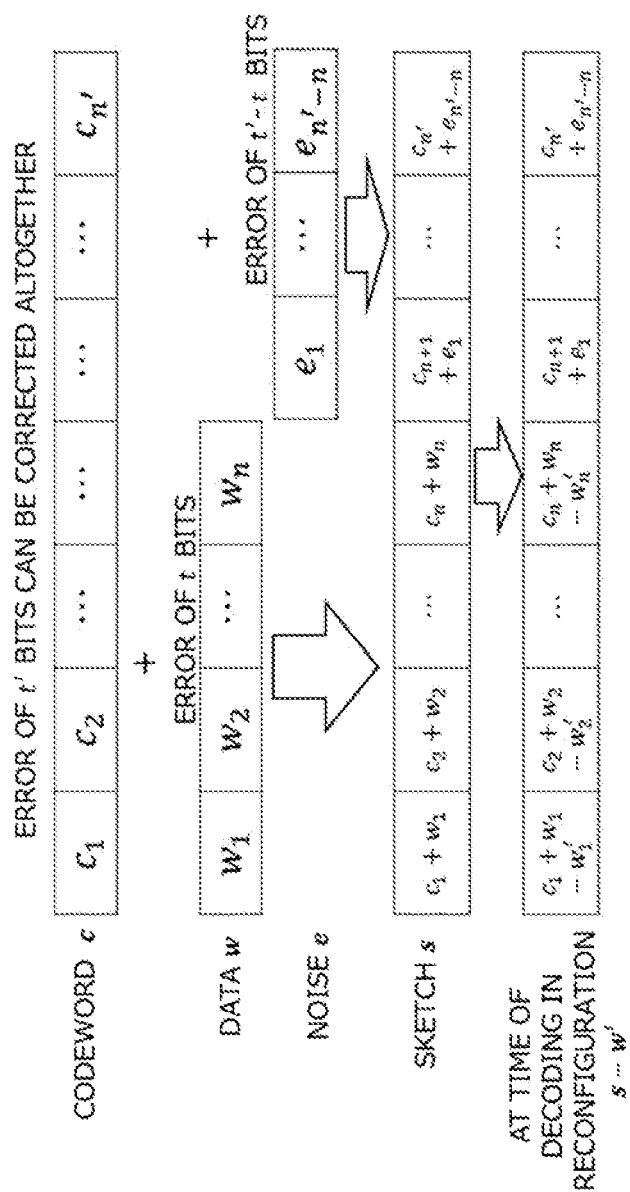
FIG. 11 is an explanatory diagram modeling the secure sketch with noise addition according to the first example embodiment.

Next, with reference to FIG. 9 to FIG. 11, the secure sketch in the information concealing system 1000 will be described. FIG. 9 is a flowchart illustrating a secure sketch algorithm ($SS'_{ecc}$) with noise addition using the error correction code. FIG. 10 is a flowchart illustrating a reconfiguration algorithm ($Rec'_{ecc}$) with noise addition using the error correction code. FIG. 11 is an explanatory diagram modeling the secure sketch with noise addition.

First, with reference to FIG. 9, a flow of the secure sketch algorithm ($SS'_{ecc}$) with noise addition using the error correction code in the information concealing apparatus 1 will be described. Here, the secure sketch using the error correction code will be described by taking an example of an (n', k', t') binary linear code (for example, a BCH code), which represents the number n' of codeword bits, the number k' of information bits, and error correction capability t' (correction is possible for an error of t' bits or less, in other words, the Hamming weight HW (e)≤t'). It is assumed that the data transmitted from the user terminal 3 to the information concealing apparatus 1.

$$w \in \{0,1\}^n \qquad \text{[Math. 16]}$$

is data having an error of t bits or less distributed on a length of n bits with each bit being a value of 0 or 1. The data w having a length of n bits with each bit being a value of 0 or 1 may be hereinafter simply referred to as "data w".

In Step S11, the codeword generating unit 110 generates the random number $$r \in \{0,1\}^{k'} \qquad \text{[Math. 25]}$$

having a length of k' bits with each bit being a value of 0 or 1. In the following description, the random number r having a length of k' bits with each bit being a value of 0 or 1 may be simply referred to as a "random number r".

In Step S12, the codeword generating unit 110 codes the random number r generated in Step S11 to generate the codeword c having a length of n' bits with each bit being a value of 0 or 1 (Expression 3-1). Here, as illustrated in FIG. 11, it is assumed that the codeword c can correct the error of t' bits altogether, and the error of the data w is t bits.

[Math. 26]

$$c := Enc(r) \in \{0,1\}^{n'} \qquad \text{(Expression 3-1)}$$

In Step S13, the noise generating unit 120 generates the noise e including a predetermined error. Here, as illustrated in FIG. 11, the noise generating unit 120 generates the noise e such that the Hamming weight (HW (e)) of the noise e is equal to a difference between the error correction capability with the codeword c having a length of n' bits with each bit being a value of 0 or 1 and the error of the data w, in other words, HW (e)=t'−t (Expression 3-2).

[Math. 27]

$$e \in \{0,1\}^{n'-n}, HW(e)=t'-t \qquad \text{(Expression 3-2)}$$

In Step S14, the concealment information generating unit 130 serially concatenates the data w and the noise e. Next, in Step S15, as illustrated in FIG. 11, the concealment information generating unit 130 generates the sketch s by adding the codeword c having a length of n' bits with each bit being a value of 0 or 1 and the data w and the noise e (Expression 3-3).

[Math. 28]

$$s := c+(w,e) \in \{0,1\}^{n'} \qquad \text{(Expression 3-3)}$$

The concealment information (sketch s, see Expression 3-3) generated by the information concealing apparatus 1 is transmitted to the information reconfiguring apparatus 2 via the network 4. The sketch s is generated by adding the data w and the noise e to the codeword c, and therefore, as compared to the data (see FIG. 6) generated by adding only the data w to the codeword c, there is less part in which the codeword c is exposed (preferably, there is no part in which the codeword c is exposed). In other words, risks of information leakage from a part in which the codeword c is not masked with the data w can be reduced.

<<2.9. Flow of Reconfiguration Algorithm with Noise Addition>>

Next, with reference to FIG. 10, a flow of the reconfiguration algorithm ($Rec'_{ecc}$) with noise addition using the error correction code in the information reconfiguring apparatus 2 will be described. Here, it is assumed that the biometric information of the user transmitted from the user terminal 3 to the information reconfiguring apparatus 2 is the data $$w' \in \{0,1\}^n \qquad \text{[Math. 29]}$$

distributed on a length of n bits with each bit being a value of 0 or 1. In the following description, the data w' having a length of n bits with each bit being a value of 0 or 1 may be simply referred to as "data w'".

In Step S21, the first reconfiguring unit 210 decodes the sketch s received from the information concealing apparatus 1, based on the biometric information (data w') of the user acquired from the user terminal 3, and reconfigures the codeword c (tilde) (Expression 3-4).

[Math. 30]

$$\tilde{c}:=Dec(s-(w',0^{n'-n}))  \quad \text{(Expression 3-4)}$$

The information reconfiguring apparatus 2 reconfigures the codeword c (tilde) without adding the noise e to the data w'. From (Expression 3-3) and (Expression 3-4), the codeword c (tilde) is expressed as in (Expression 3-5).

[Math. 31]

$$\tilde{c}=Dec(c+(w-w',e))\in\{0,1\}^{n'} \quad \text{Expression 3-5}$$

Here, the error of the noise e is t'−t bits as described above. When the data w' used in Step S21 is close to the data w (in other words, when HW (w−w')≤t), the entire error of the data (w−w', e) to which the noise e is concatenated is t+(t'−t) bits. In this case, it can be derived that, by performing error correction on (Expression 3-5) regarding the data (w−w, e) to which the noise e is concatenated with the use of the error correction code, the codeword c (tilde) closest to the input data w' is equal to the codeword c (Expression 3-6).

[Math. 32]

$$\tilde{c}=c\in\{0,1\}^{n'} \quad \text{(Expression 3-6)}$$

When the data w' is close to the data w (in other words, when HW (w−w')≤t), the entire error of the data (w−w', e) to which the noise e is concatenated can be error-corrected with the codeword c reconfigured in Step S21. In Step S22, the correction processing unit 220 performs error correction on the data (w−w', e) to which the noise e is concatenated by using the codeword c reconfigured in Step S21.

In the flowchart of FIG. 9, the noise e is generated after the data w is acquired. In Step S23, the correction processing unit 220 outputs first n bits of data obtained by subtracting the codeword c (tilde) from the sketch s as the data w (tilde). Here, according to (Expression 3-6), codeword c (tilde) =codeword c, and therefore the data obtained by subtracting the codeword c (tilde) from the sketch s corresponds to data obtained by subtracting the codeword c from the sketch s. In other words, in Step S23, the data w (tilde) output by the correction processing unit 220 is data corresponding to the data w.

In this manner, the information reconfiguring apparatus 2 can acquire the data w concealed in the sketch s (the biometric information of the user input to the information concealing apparatus 1), based on the concealment information (sketch s, see Expression 3-3) generated by the information concealing apparatus 1 and the biometric information (data w') of the user. In this case, to infer the data w concealed in the sketch s, the data w and the data w' need to be data close to each other. Accordingly, when biometric information of a user different from the user corresponding to the data w is input to the information reconfiguring apparatus 2, the biometric information of the user corresponding to the data w is failed to be reconfigured, and therefore leakage of the biometric information can be reduced. With the sketch s transmitted from the information concealing apparatus 1, risks of information leakage from a part in which the codeword c is not masked with the data w can be reduced, and therefore information leakage risks in the information concealing system 1000 can be further reduced, and security can be enhanced.

3. Second Example Embodiment

Next, with reference to FIG. 12 to FIG. 15, a second example embodiment of the present invention will be described. The present example embodiment is different from the first example embodiment in that the information reconfiguring apparatus 2 receives a plurality of pieces of concealment information generated by the information concealing apparatus 1, and reconfigures information concealed in the pieces of concealment information. An operation mode of the information concealing system 1000 according to the second example embodiment is similar to that in the first example embodiment. A configuration of the information concealing apparatus 1 according to the second example embodiment is also similar to that in the first example embodiment. In description of the second example embodiment, description of parts that overlap the description of the first example embodiment will be omitted.

<<3.1. Functional Configuration of Information Reconfiguring Apparatus>>

Figure 12:
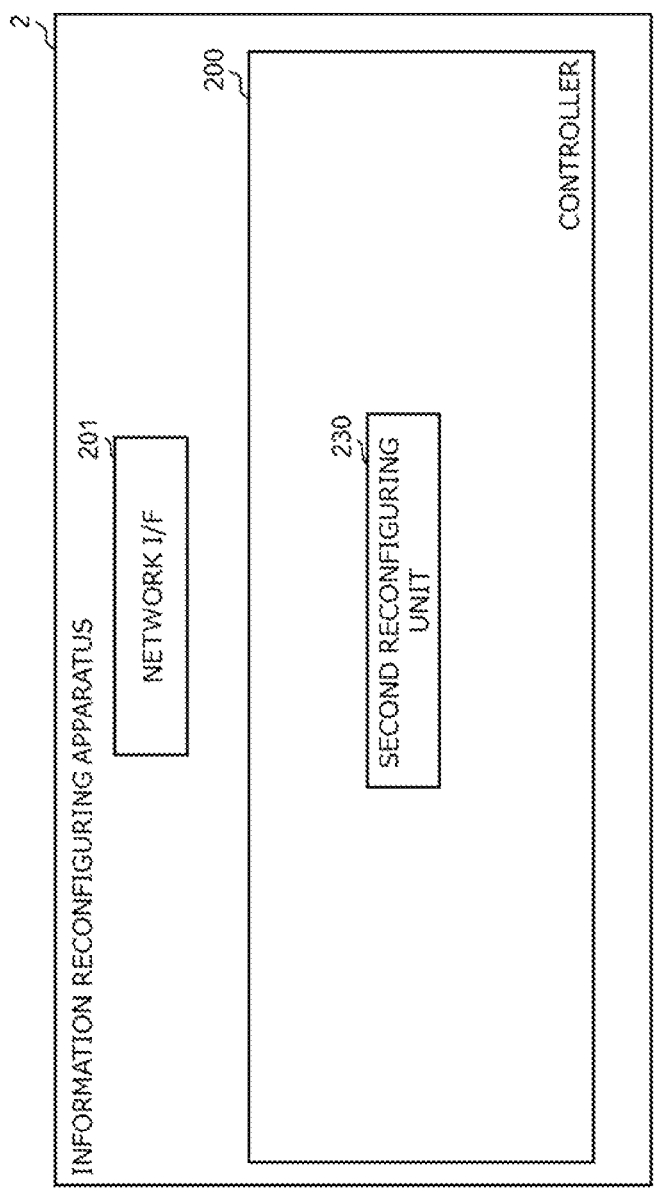
FIG. 12 is a functional block diagram illustrating a functional configuration of the information reconfiguring apparatus according to a second example embodiment.

First, with reference to FIG. 12, a functional configuration of the information reconfiguring apparatus 2 according to the second example embodiment will be described. FIG. 12 is a functional block diagram illustrating a functional configuration of the information reconfiguring apparatus 2 according to the second example embodiment.

In the present example, the information reconfiguring apparatus 2 receives a sketch s and a sketch s' as pieces of concealment information generated by the information concealing apparatus 1. The sketch s corresponds to first concealment information of the present example embodiment, and the sketch s' corresponds to second concealment information of the present example embodiment. Similarly to the first example embodiment, the sketch s is generated by adding biometric information (data w) of the user input to the information concealing apparatus 1 and a codeword c capable of error-correcting the data w. The data w corresponds to first concealment-side input information of the present example embodiment, and the codeword c corresponds to a first codeword of the present example embodiment. In addition, similarly to the first example embodiment, the sketch s' is generated by adding biometric information (data w') of the user input to the information concealing apparatus 1 and a codeword c' capable of error-correcting the data w'. The data w' corresponds to second concealment-side input information of the present example embodiment, and the codeword c' corresponds to a second codeword of the present example embodiment.

In the second example embodiment, the information reconfiguring apparatus 2 includes a second reconfiguring unit 230, instead of the first reconfiguring unit 210 and the correction processing unit 220 of the first example embodiment. The second reconfiguring unit 230 reconfigures difference information indicating a difference w−w' between the data w and the data w', based on the sketch s and the sketch s'.

<<3.2. Flow of Secure Sketch Algorithm with Noise Addition>>

Figure 13:
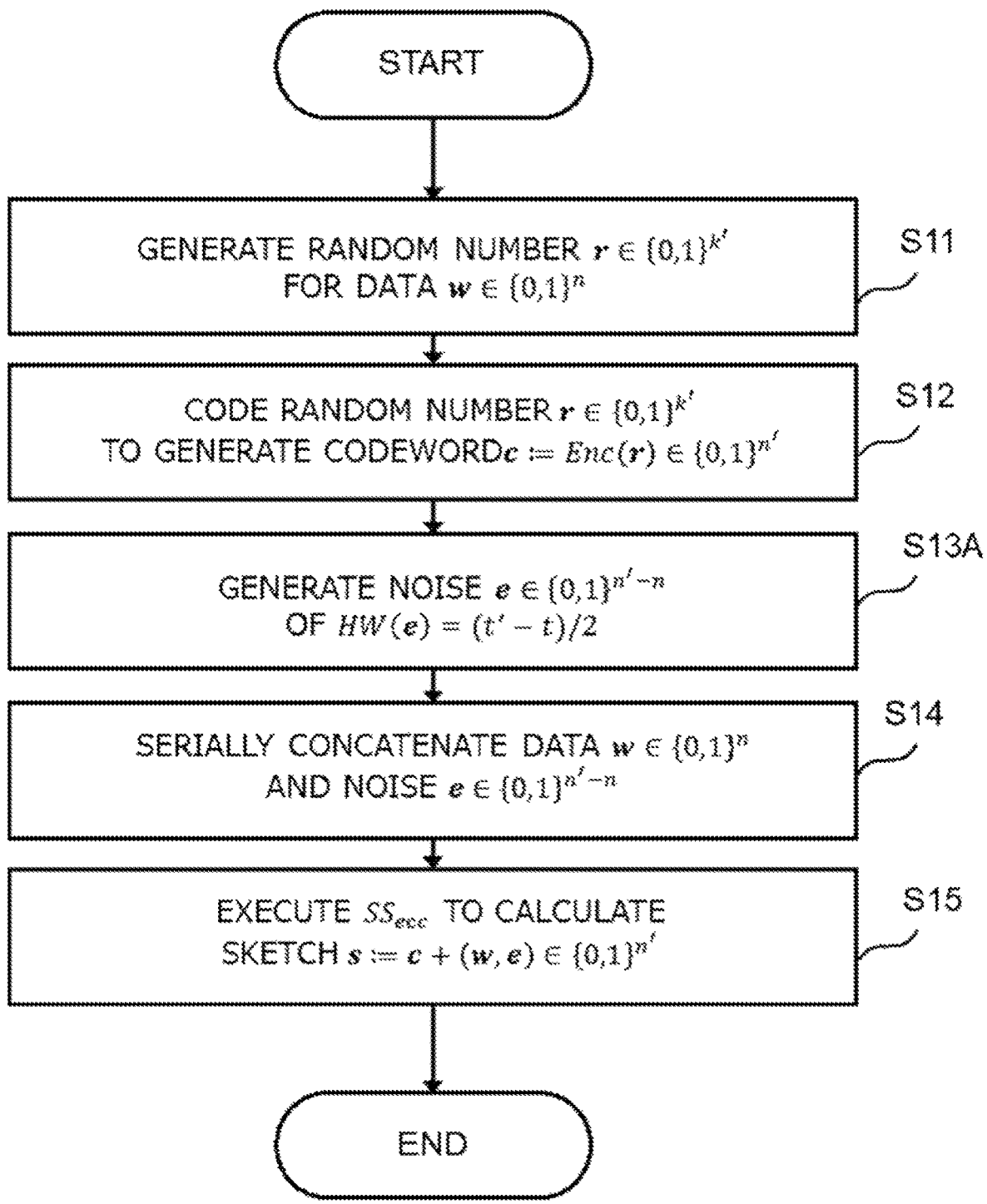
FIG. 13 is a flowchart illustrating the secure sketch algorithm with noise addition using the error correction code according to the second example embodiment.
Figure 14:
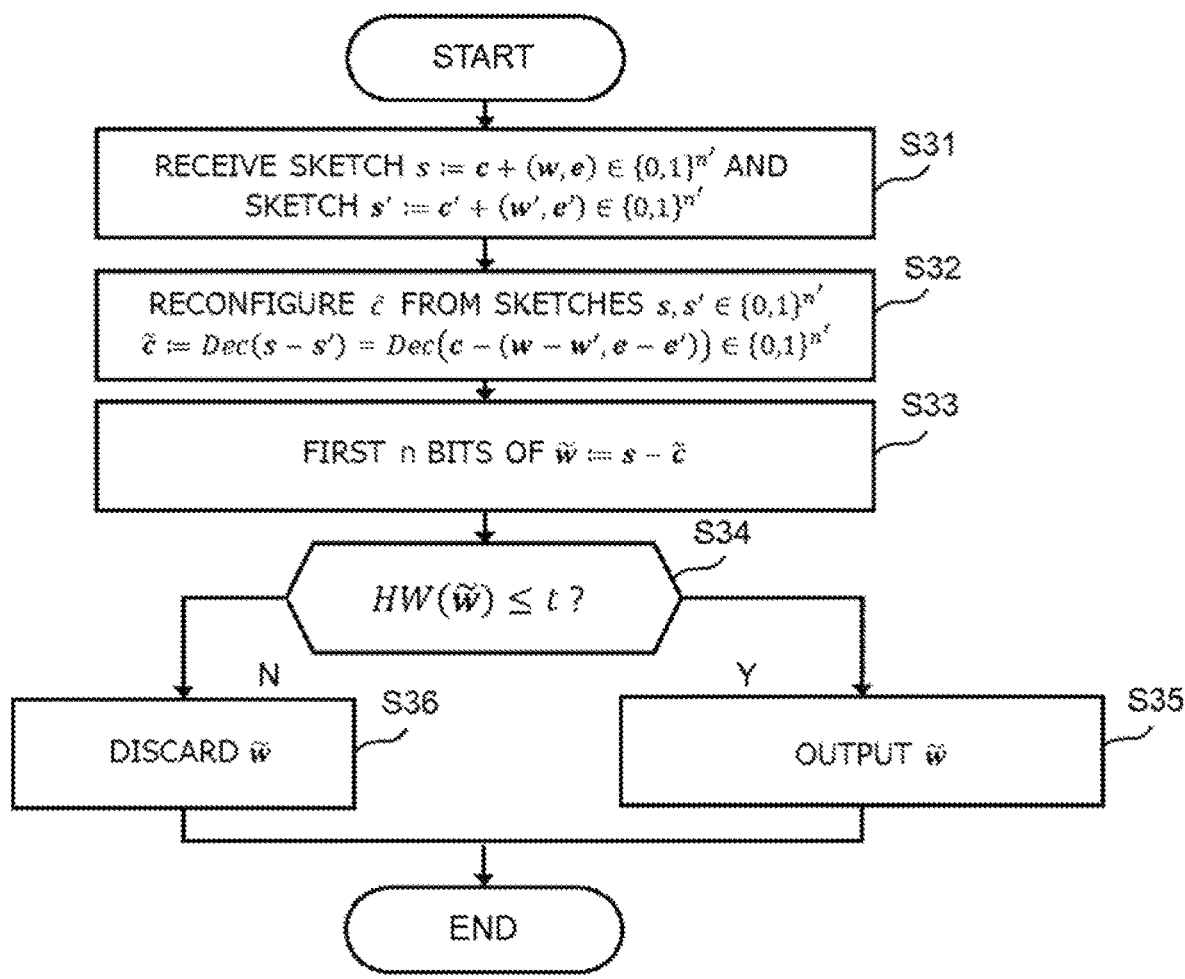
FIG. 14 is a flowchart illustrating the reconfiguration algorithm with noise addition using the error correction code according to the second example embodiment.

Next, with reference to FIG. 13 to FIG. 15, a flow of the secure sketch in the information concealing system 1000 will be described. FIG. 13 is a flowchart illustrating a flow of the secure sketch algorithm ($SS'_{ecc}$) with noise addition using the error correction code. FIG. 14 is a flowchart illustrating a flow of the reconfiguration algorithm ($Rec'_{ecc}$) with noise addition using the error correction code. FIG. 15 is an explanatory diagram modeling the secure sketch with noise addition.

First, with reference to FIG. 13, a flow of the secure sketch algorithm ($SS'_{ecc}$) with noise addition using the error correction code in the information concealing apparatus 1 will be described. Here, description will be given by taking an example of an (n', k', t') binary linear code (for example, a BCH code), which represents the number n' of codeword bits, the number k' of information bits, and error correction capability t' (correction is possible for an error of t' bits or less, in other words, the Hamming weight HW (e)≤t').

It is assumed that, similarly to the first example embodiment, the data w and the data w' are each data including an error of t bits or less distributed on a length of n bits with each bit being a value of 0 or 1, and it is assumed that the data w' is data close to the data w. It is assumed that, as the error correction capability of each of the codeword and the codeword c', t'-bit error correction can be performed altogether.

Note that, in the illustration of FIG. 13, steps the same as those in the first example embodiment of FIG. 9 are denoted by the same reference signs, and overlapping description will be omitted. In the present example embodiment, the Hamming weight HW (e) of the noise e generated by the noise generating unit 120 is different from that in the first example embodiment.

In Step S13A, the noise generating unit 120 generates noise e and noise e' including a predetermined error. The noise e is concatenated to the data w in Step S14, and the noise e' is concatenated to the data w' in Step S14. The noise e corresponds to first noise of the present example, and the noise e' corresponds to second noise of the present example. Here, as illustrated in FIG. 15, the noise generating unit 120 generates the noise e such that the sum of the Hamming weights (HW (e)) of generated noise is equal to or less than a difference between the error correction capability with the codeword c and the error of the data w (Expression 3-2A). In the present example embodiment, as illustrated in FIG. 15, the noise generating unit 120 generates the noise e and the noise e' including an error of (t'−t)/2 bits.

[Math. 33]

$$e \in \{0,1\}^{n'-n}, HW(e)=(t'-t)/2 \quad \text{(Expression 3-2A)}$$

In the present example embodiment, the information concealing apparatus 1 executes the secure sketch algorithm ($SS'_{ecc}$) with noise addition using the error correction code illustrated in FIG. 13 on each of the data w and the data W. As a result, as illustrated in FIG. 15, the sketch s and the sketch s' respectively including the noise e and the noise e' including the error of (t'−t)/2 bits are generated, and are transmitted to the information reconfiguring apparatus 2. The sketch s is generated by adding the data w and the noise e to the codeword c. The sketch s' is generated by adding the data w' and the noise e' to the codeword c'.

<<3.3. Flow of Reconfiguration Algorithm with Noise Addition>>

Next, with reference to FIG. 14, a flow of the reconfiguration algorithm ($Rec'_{ecc}$) with noise addition using the error correction code in the information reconfiguring apparatus 2 according to the present example embodiment will be described.

In Step S31, the second reconfiguring unit 230 receives the sketch s and the sketch s' from the information concealing apparatus 1 (Expression 4-1).

[Math. 34]

$$s:=c+(w,e) \in \{0,1\}^{n'}, s':=c'+(w',e') \in \{0,1\}^{n'} \quad \text{(Expression 4-1)}$$

In Step S32, the second reconfiguring unit 230 decodes the difference between the sketch s and the sketch s' and reconfigures the codeword c (tilde). From (Expression 4-1), the codeword c (tilde) is expressed as in (Expression 4-2).

[Math. 35]

$$\tilde{c}:=Dec(s-s')=Dec(c-(w-w',e-e')) \in \{0,1\}^{n'} \quad \text{(Expression 4-2)}$$

Here, the sum of the errors of the noise e and the noise e' is t'−t bits as described above. The errors of the data w' and the data w are equal to or less than t bits as described above. In this case, it can be derived that, by performing error correction on (Expression 4-2) by using the error correction code, the codeword c (tilde) is equal to the codeword c (Expression 4-3).

[Math. 36]

$$\tilde{c}=c \in \{0,1\}^{n'} \quad \text{(Expression 4-3)}$$

Since the data w' is close to the data w (HW (w−w')≤t), the error of the difference w−w' between the data w and the data w' is t bits or less, and error correction can be successfully performed on the error of the difference w−w' by using the codeword c reconfigured in Step S32. The second reconfiguring unit 230 performs error correction on the error of the difference w−w' by using the codeword c reconfigured in Step S32.

Next, in Step S33, the second reconfiguring unit 230 outputs first n bits of data obtained by subtracting the codeword c (tilde) from the sketch s as the data w (tilde). Here, according to (Expression 4-3), codeword c (tilde) =codeword c, and therefore the data obtained by subtracting the codeword c (tilde) from the sketch s corresponds to data obtained by subtracting the codeword c from the sketch s. In other words, in Step S33, the second reconfiguring unit 230 uses the difference w−w' between the data w and the data w' as the data w (tilde).

Next, in Step S34, the second reconfiguring unit 230 determines whether or not the difference w−w' between the data w and the data w', in other words, the Hamming weight HW (w (tilde)) of w (tilde), is t or less. In the present example embodiment, when the bits to which the noise e is added in the sketch s and the bits to which the noise e' is added in the sketch s' match, the error of the part in which the noise is added in the sketch s and the sketch s' is smaller than t'−t bits. This indicates that, for example, even when the error of the data w and the data w' is greater than t bits, error correction with the codeword c (or the codeword c') can be successfully performed.

In other words, when the bits to which the noise e is added in the sketch s and the bits to which the noise e' is added in the sketch s' do not match, the error of the part in which the noise is added in the sketch s and the sketch s' is larger than t'−t bits, and thus the error of the data w and the data w' is not corrected.

When the Hamming weight HW (w (tilde)) of w (tilde) is equal to or less than t (S34/Y), in Step S35, the second reconfiguring unit 230 outputs the data w (tilde) defined in Step S33. In contrast, when the Hamming weight HW (w (tilde)) of w (tilde) is greater than t (S34/N), in Step S36, the second reconfiguring unit 230 discards the data w (tilde) defined in Step S33.

In this manner, the information reconfiguring apparatus 2 can acquire a plurality of pieces of concealment information (the sketch s and the sketch s') generated by the information concealing apparatus 1, and infer the difference w−w' (difference information) between the data w concealed in the sketch s and the data w' concealed in the sketch s'. In this case, although the data w and the data w' are concealed in the sketch s and the sketch s', respectively, the data w or the data w' cannot be reconfigured with only the sketch s or the sketch s'. Thus, risks of leakage of the data w and the data w' can be reduced, and the difference w–w' between the data w concealed in the sketch s and the data w' concealed in the sketch s' can be inferred to be used for various types of processing.

4. Third Example Embodiment

Next, with reference to FIG. 16 to FIG. 19, a third example embodiment of the present invention will be described. The first example embodiment and the second example embodiment described above are specific example embodiments, whereas the third example embodiment is a more generalized example embodiment.

Figure 16:
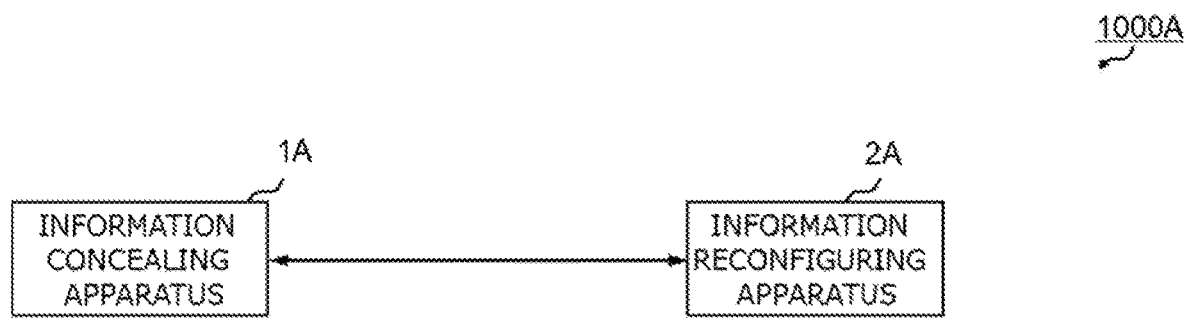
FIG. 16 is a diagram illustrating an example of an operation mode of an information concealing system according to a third example embodiment.

FIG. 16 is a block diagram illustrating a schematic configuration of an information concealing system 1000A according to the third example embodiment of the present invention. As illustrated in FIG. 16, the information concealing system 1000A includes an information concealing apparatus 1A and an information reconfiguring apparatus 2A.

Figure 17:
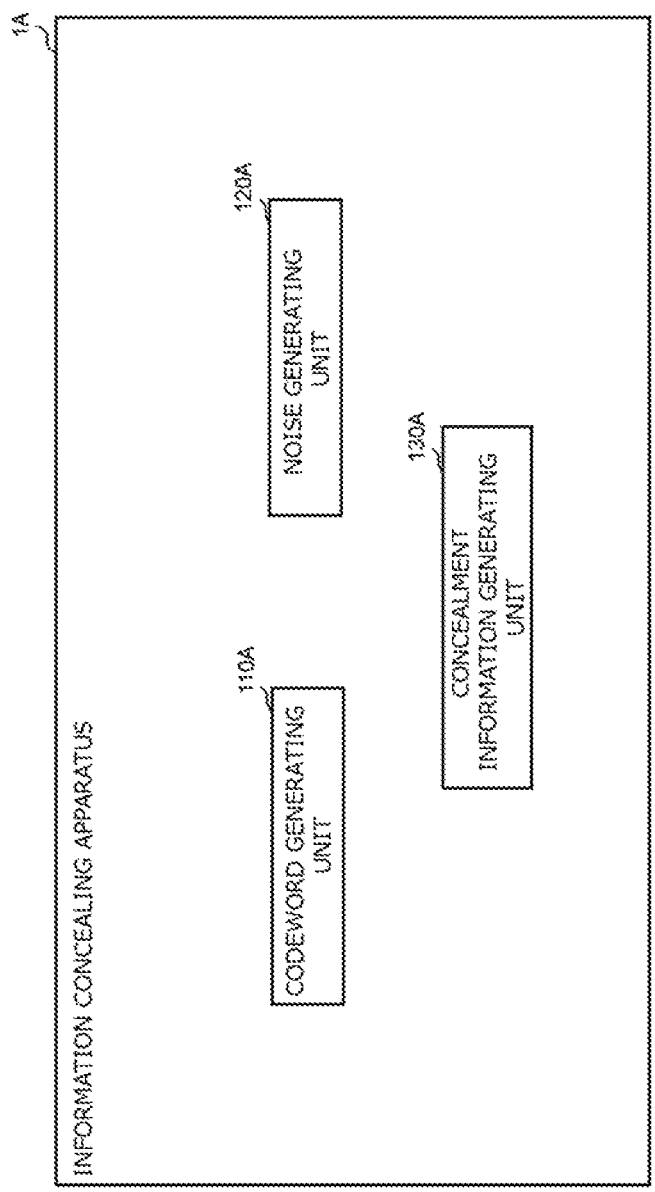
FIG. 17 is a functional block diagram illustrating a functional configuration of an information concealing apparatus according to the third example embodiment.

FIG. 17 is a block diagram illustrating a schematic configuration of the information concealing apparatus 1A according to the third example embodiment. The information concealing apparatus 1A includes a codeword generating unit 110A, a noise generating unit 120A, and a concealment information generating unit 130A.

The codeword generating unit 110A generates a codeword capable of error-correcting concealment-side input information. The noise generating unit 120A generates noise including a predetermined error. The concealment information generating unit 130A generates concealment information capable to reconfigure the concealment-side input information, by adding the concealment-side input information and the noise to the codeword.

Figure 18:
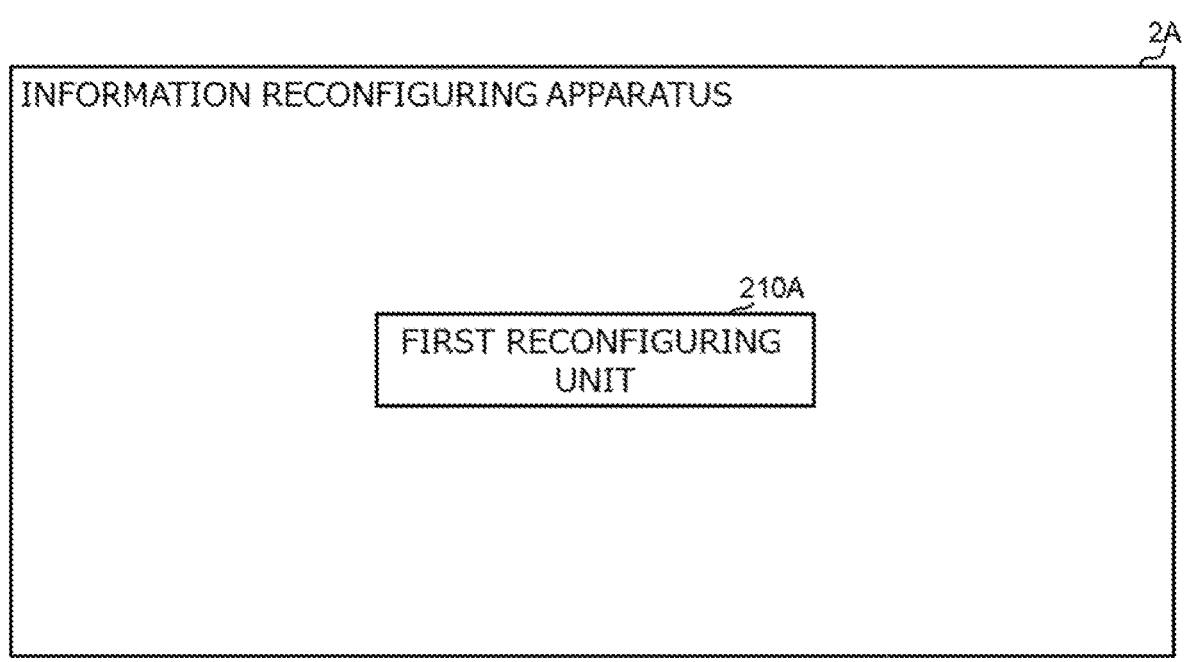
FIG. 18 is a functional block diagram illustrating an example of a functional configuration of an information reconfiguring apparatus according to the third example embodiment.

FIG. 18 is a block diagram illustrating an example of a schematic configuration of the information reconfiguring apparatus 2A according to the third example embodiment. The information reconfiguring apparatus 2A includes a first reconfiguring unit 210A. The first reconfiguring unit 210A reconfigures a codeword from concealment information, based on reconfiguration-side input information and the concealment information.

Figure 19:
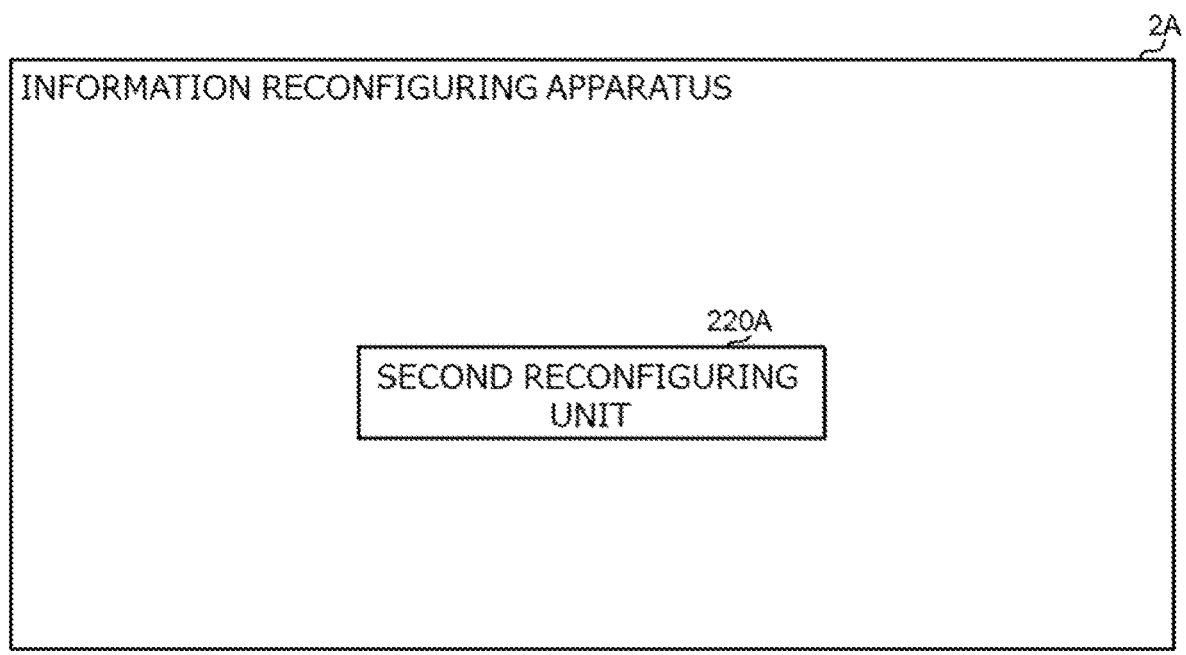
FIG. 19 is a functional block diagram illustrating another example of a functional configuration of the information reconfiguring apparatus according to the third example embodiment.

FIG. 19 is a block diagram illustrating another example of a schematic configuration of the information reconfiguring apparatus 2A according to the third example embodiment. The information reconfiguring apparatus 2A includes a second reconfiguring unit 220A. The second reconfiguring unit 220A reconfigures difference information indicating a difference between first concealment-side input information and second concealment-side input information, based on first concealment information and second concealment information.

Relationship with First Example Embodiment

As an example, the information concealing apparatus 1A according to the third example embodiment may execute operations of the information concealing apparatus 1 according to the first example embodiment. Similarly, as an example, the information reconfiguring apparatus 2A illustrated in FIG. 18 may execute operations of the information reconfiguring apparatus 2 according to the first example embodiment. Similarly, as an example, the information reconfiguring apparatus 2A illustrated in FIG. 19 may execute operations of the information reconfiguring apparatus 2 according to the second example embodiment. Similarly, as an example, when the information concealing system 1000A according to the third example embodiment includes the information reconfiguring apparatus 2A illustrated in FIG. 18, the information concealing system 1000A may be configured similarly to the information concealing system 1000 according to the first example embodiment. Similarly, as an example, when the information concealing system 1000A according to the third example embodiment includes the information reconfiguring apparatus 2A illustrated in FIG. 19, the information concealing system 1000A may be configured similarly to the information concealing system 1000 according to the second example embodiment. In the case described above, description regarding the first example embodiment or the second example embodiment can also be applied to the third example embodiment. Note that the third example embodiment is not limited to the examples described above.

5. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the flowchart. For example, the steps in the processing may be executed in an order different from that described in the corresponding flowchart or may be executed in parallel. Some of the steps in the processing may be deleted, or more steps may be added to the processing.

An apparatus including constituent elements (the codeword generating unit, the noise generating unit, and/or the concealment information generating unit) of the information concealing apparatus described in the Specification (e.g., one or more apparatuses (or units) among a plurality of apparatuses (or units) constituting the information concealing apparatus or a module for one of the plurality of apparatuses (or units)) may be provided. An apparatus including constituent elements (the first reconfiguring unit, the correction processing unit, and/or the second reconfiguring unit) of the information reconfiguring apparatus described in the Specification (e.g., one or more apparatuses (or units) among a plurality of apparatuses (or units) constituting the information reconfiguring apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

An information concealing apparatus comprising:
a codeword generating unit configured to generate a codeword capable of error-correcting concealment-side input information;
a noise generating unit configured to generate noise including a predetermined error; and
a concealment information generating unit configured to generate concealment information capable to reconfigure the concealment-side input information, by adding the concealment-side input information and the noise to the codeword.

(Supplementary Note 2)

The information concealing apparatus according to supplementary note 1, wherein
the noise generating unit is configured to determine the predetermined error such that a sum of Hamming weights of the noise generated is equal to or less than a difference between error correction capability of the codeword and an error of the concealment-side input information.

(Supplementary Note 3)

The information concealing apparatus according to supplementary note 1 or 2, wherein
the concealment information generating unit is configured to concatenate the concealment-side input information and the noise, and then generate the concealment information by adding the concealment-side input information and the noise being concatenated to the codeword.

(Supplementary Note 4)

The information concealing apparatus according to any one of supplementary notes 1 to 3, wherein
the codeword generating unit is configured to generate a random number, codes the random number to generate the codeword.

(Supplementary Note 5)

The information concealing apparatus according to any one of supplementary notes 1 to 3, wherein
the codeword generating unit is configured to code a private key to generate the codeword.

(Supplementary Note 6)

The information concealing apparatus according to any one of supplementary notes 1 to wherein
the concealment-side input information is biometric information.

(Supplementary Note 7)

An information reconfiguring apparatus for receiving concealment information, wherein
the concealment information is generated by adding concealment-side input information and noise including a predetermined weight to a codeword capable of error-correcting the concealment-side input information, and
the information reconfiguring apparatus comprises
a first reconfiguring unit configured to reconfigure the codeword from the concealment information, based on reconfiguration-side input information and the concealment information.

(Supplementary Note 8)

The information reconfiguring apparatus according to supplementary note 7, further comprising
a correction processing unit configured to error-correct the reconfiguration-side input information with the codeword reconfigured.

(Supplementary Note 9)

The information reconfiguring apparatus according to supplementary note 7 or 8, wherein
the concealment-side input information and the reconfiguration-side input information are biometric information.

(Supplementary Note 10)

An information reconfiguring apparatus for receiving first concealment information and second concealment information, wherein
the first concealment information is generated by adding first concealment-side input information and first noise including a predetermined weight to a first codeword capable of error-correcting the first concealment-side input information,
the second concealment information is generated by adding second concealment-side input information and second noise including a predetermined weight to a second codeword capable of error-correcting the second concealment-side input information, and
the information reconfiguring apparatus comprises
a second reconfiguring unit configured to reconfigure difference information indicating a difference between the first concealment-side input information and the second concealment-side input information, based on the first concealment information and the second concealment information.

(Supplementary Note 11)

The information reconfiguring apparatus according to supplementary note 10, wherein
a length of the first concealment-side input information and a length of the second concealment-side input information are each a first length, and
the second reconfiguring unit is configured to discard the difference information when a Hamming weight of the difference information is greater than the first length.

(Supplementary Note 12)

The information reconfiguring apparatus according to supplementary note 10 or 11, wherein
the first concealment-side input information and the second concealment-side input information are biometric information.

(Supplementary Note 13)

An information concealing system comprising:
the information concealing apparatus according to any one of claims 1 to 6; and
the information reconfiguring apparatus according to any one of claims 7 to 12.

(Supplementary Note 14)

An information concealing method comprising:
generating a codeword capable of error-correcting concealment-side input information;
generating noise including a predetermined weight; and
generating concealment information capable to reconfigure the concealment-side input information, by adding the concealment-side input information and the noise to the codeword.

(Supplementary Note 15)

An information reconfiguring method, wherein
concealment information is generated, by an information concealing apparatus, by adding concealment-side input information input to the information concealing apparatus and noise including a predetermined weight to a codeword capable of error-correcting the concealment-side input information, and
the information reconfiguring method comprises
reconfiguring the codeword from the concealment information, based on reconfiguration-side input information and the concealment information.

(Supplementary Note 16)

An information reconfiguring method, wherein first concealment information is generated, by an information concealing apparatus, by adding first concealment-side input information input to the information concealing apparatus and first noise including a predetermined weight to a first codeword capable of error-correcting the first concealment-side input information, second concealment information is generated, by the information concealing apparatus, by adding second concealment-side input information input to the information concealing apparatus and second noise including a predetermined weight to a second codeword capable of error-correcting the second concealment-side input information, and the information reconfiguring method comprises reconfiguring difference information indicating a difference between the first concealment-side input information and the second concealment-side input information, based on the first concealment information and the second concealment information.

(Supplementary Note 17)

An information concealing program causing a computer to execute:

generating a codeword capable of error-correcting concealment-side input information;

generating noise including a predetermined weight; and generating concealment information capable to reconfigure the concealment-side input information, by adding the concealment-side input information and the noise to the codeword.

(Supplementary Note 18)

An information reconfiguring program, wherein concealment information is generated, by an information concealing apparatus, by adding concealment-side input information input to the information concealing apparatus and noise including a predetermined weight to a codeword capable of error-correcting the concealment-side input information, and the information reconfiguring program causes a computer to execute reconfiguring the codeword from the concealment information, based on reconfiguration-side input information and the concealment information.

(Supplementary Note 19)

An information reconfiguring program, wherein first concealment information is generated, by an information concealing apparatus, by adding first concealment-side input information input to the information concealing apparatus and first noise including a predetermined weight to a first codeword capable of error-correcting the first concealment-side input information, second concealment information is generated, by the information concealing apparatus, by adding second concealment-side input information input to the information concealing apparatus and second noise including a predetermined weight to a second codeword capable of error-correcting the second concealment-side input information, and the information reconfiguring program causes a computer to execute reconfiguring difference information indicating a difference between the first concealment-side input information and the second concealment-side input information, based on the first concealment information and the second concealment information.

INDUSTRIAL APPLICABILITY

An information concealing apparatus, an information reconfiguring apparatus, an information concealing system, an information concealing method, an information reconfiguring method, an information concealing program, and an information reconfiguring program to reduce information leakage risks can be provided.

REFERENCE SIGNS LIST 1, 1A Information Concealing Apparatus
2, 2A Information Reconfiguring Apparatus
3 User Terminal
4 Network
11 CPU
12 ROM
13 RAM
14 Storage Medium
15 Interface (I/F)
16 Bus
17 Input Unit
18 Display Unit
100 Controller
110, 110A Codeword Generating Unit
120, 120A Noise Generating Unit
130, 130A Concealment Information Generating Unit
200 Controller
210, 210A First Reconfiguring Unit
220 Correction Processing Unit
220A Second Reconfiguring Unit
230 Second Reconfiguring Unit
1000, 1000A Information Concealing System

What is claimed is:

1. An information concealing apparatus comprising:
a memory storing instructions; and
one or more processors configured to execute the instructions to:
generate a codeword capable of error-correcting concealment-side input information;
generate noise including a predetermined error; and
generate concealment information capable of reconfiguring the concealment-side input information, by adding the concealment-side input information and the noise to the codeword, wherein
the one or more processors are configured to execute the instructions to determine the predetermined error such that a sum of Hamming weights of the noise that is generated is equal to or less than a difference between an error-correcting capability of the codeword and an error of the concealment-side input information.

2. The information concealing apparatus according to claim 1, wherein
the one or more processors are configured to execute the instructions to concatenate the concealment-side input information and the noise, and then generate the concealment information by adding the concealment-side input information and the noise, as have been concatenated, to the codeword.

3. The information concealing apparatus according to claim 1, wherein
the one or more processors are configured to execute the instructions to generate a random number, and code the random number to generate the codeword.

4. The information concealing apparatus according to claim 1, wherein
the one or more processors are configured to execute the instructions to code a private key to generate the codeword.

5. The information concealing apparatus according to claim 1, wherein the concealment-side input information is biometric information.

6. An information reconfiguring apparatus for receiving first concealment information and second concealment information, comprising:
a memory storing instructions; and
one or more processors, wherein
the first concealment information is generated by adding first concealment-side input information and first noise including a predetermined weight to a first codeword capable of error-correcting the first concealment-side input information,
the second concealment information is generated by adding second concealment-side input information and second noise including a predetermined weight to a second codeword capable of error-correcting the second concealment-side input information, and
the one or more processors are configured to execute the instructions to reconfigure difference information indicating a difference between the first concealment-side input information and the second concealment-side input information, based on the first concealment information and the second concealment information.

7. The information reconfiguring apparatus according to claim 6, wherein
a length of the first concealment-side input information and a length of the second concealment-side input information are each a first length, and
the one or more processors are configured to execute the instructions to discard the difference information when a Hamming weight of the difference information is greater than the first length.

8. The information reconfiguring apparatus according to claim 6, wherein
the first concealment-side input information and the second concealment-side input information are biometric information.

9. An information concealing method performed by a computer and comprising:
generating a codeword capable of error-correcting concealment-side input information;
generating noise including a predetermined weight; and
generating concealment information capable to reconfigure the concealment-side input information, by adding the concealment-side input information and the noise to the codeword, wherein
the information concealing method further comprises determining the predetermined error such that a sum of Hamming weights of the noise generated is equal to or less than a difference between error correction capability of the codeword and an error of the concealment-side input information.

* * * * *